United States Patent
Quan et al.

(10) Patent No.: US 10,433,334 B2
(45) Date of Patent: Oct. 1, 2019

(54) METHOD AND APPARATUS FOR SENDING DOWNLINK DATA IN A TIME-DOMAIN BUNDLING MANNER OR A FREQUENCY-DOMAIN BUNDLING MANNER

(71) Applicant: Huawei Technologies Co., Ltd., Shenzhen (CN)

(72) Inventors: Wei Quan, Beijing (CN); Jian Zhang, Beijing (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 140 days.

(21) Appl. No.: 14/820,190

(22) Filed: Aug. 6, 2015

(65) Prior Publication Data
US 2015/0341960 A1    Nov. 26, 2015

Related U.S. Application Data

(63) Continuation of application No. PCT/CN2013/071518, filed on Feb. 7, 2013.

(51) Int. Cl.
*H04W 74/00* (2009.01)
*H04L 12/841* (2013.01)
(Continued)

(52) U.S. Cl.
CPC ............ *H04W 74/006* (2013.01); *H04L 1/08* (2013.01); *H04L 1/189* (2013.01); *H04L 1/1896* (2013.01);
(Continued)

(58) Field of Classification Search
CPC ... H04L 5/0044; H04L 5/0053; H04L 5/0091; H04L 1/1896; H04L 47/283; H04L 1/08; H04L 1/189; H04W 74/006
See application file for complete search history.

(56) References Cited

U.S. PATENT DOCUMENTS 8,233,442 B1 *  7/2012  Longoni ............. H04W 76/048
                                                    370/329
8,756,477 B2 *  6/2014  Challa ............... H03M 13/6525
                                                    370/242
(Continued)

FOREIGN PATENT DOCUMENTS

CN    102124774 A    7/2011
CN    102160319 A    8/2011
(Continued)

OTHER PUBLICATIONS

"3rd Generation Partnership Project; Technical Specification Group Radio Access Network; Evolved Universal Terrestrial Radio Access (E-UTRA); Multiplexing and Channel Coding (Release 11 )," 3GPP TS 36.212, V11.1.0, Dec. 2012, 82 pages.
(Continued)

*Primary Examiner* — Peter P Chau
(74) *Attorney, Agent, or Firm* — Slater Matsil, LLP

(57) ABSTRACT

Embodiments of the present invention provide a data transmission method and apparatus. The method includes generating a configuration message. The configuration message is used to configure, for user equipment UE, a function of receiving downlink bundled data, and the downlink bundled data is downlink data that is repeatedly transmitted at least twice. The configuration message to the UE and the downlink bundled data are sent to the UE. According to the data transmission method and apparatus provided in the embodiments of the present invention, downlink data is sent to user equipment in a downlink bundling manner, thereby shortening a delay of the downlink data transmission. If the downlink data is PDCCH control signaling, timeliness of an operation indicated by the PDCCH control signaling is improved.

9 Claims, 5 Drawing Sheets

(51) Int. Cl.
  *H04L 5/00* (2006.01)
  *H04L 1/08* (2006.01)
  *H04L 1/18* (2006.01)
(52) U.S. Cl.
  CPC .......... *H04L 5/0044* (2013.01); *H04L 5/0053* (2013.01); *H04L 5/0091* (2013.01); *H04L 47/283* (2013.01)

(56) References Cited

U.S. PATENT DOCUMENTS

| | | | |
|---|---|---|---|
| 2008/0074999 A1* | 3/2008 | Usuda | H04L 1/1607 |
| | | | 370/229 |
| 2010/0067412 A1 | 3/2010 | Kitazoe et al. | |
| 2010/0202382 A1* | 8/2010 | Park | H04L 5/0053 |
| | | | 370/329 |
| 2011/0141952 A1 | 6/2011 | Wang et al. | |
| 2012/0057560 A1 | 3/2012 | Park et al. | |
| 2012/0069798 A1* | 3/2012 | Vitthaladevuni | H04L 1/02 |
| | | | 370/328 |
| 2012/0201229 A1 | 8/2012 | Feng et al. | |
| 2013/0028213 A1 | 1/2013 | Ko et al. | |
| 2013/0083753 A1* | 4/2013 | Lee | H04W 72/0453 |
| | | | 370/329 |
| 2014/0044056 A1* | 2/2014 | Chen | H04W 72/04 |
| | | | 370/329 |
| 2014/0098761 A1* | 4/2014 | Lee | H04W 74/006 |
| | | | 370/329 |
| 2014/0348056 A1 | 11/2014 | Feng et al. | |
| 2015/0078308 A1* | 3/2015 | Lee, II | H04L 5/0023 |
| | | | 370/329 |

FOREIGN PATENT DOCUMENTS

| | | |
|---|---|---|
| CN | 102648598 A | 8/2012 |
| WO | 2010112963 A1 | 10/2010 |
| WO | 2014025381 A1 | 2/2014 |

OTHER PUBLICATIONS

"3rd Generation Partnership Project; Technical Specification Group Radio Access Network; Evolved Universal Terrestrial Radio Access (E-UTRA); Physical Layer Procedures (Release 11)," 3GPP TS 36.213, V11.1.0, Dec. 2012, 160 pages.

"3rd Generation Partnership Project; Technical Specification Group Radio Access Network; Evolved Universal Terrestrial Radio Access (E-UTRA); Medium-Access Control (MAC) Protocol Specification (Release 11)," 3GPP TS 36.321, V11.1.0, Dec. 2012, 57 pages.

"3rd Generation Partnership Project; Technical Specification Group Radio Access Network; Evolved Universal Terrestrial Radio Access (E-UTRA); Radio Resource Control (RRC); Protocol Specification (Release 11)," 3GPP TS 36.331, V11.2.0, Dec. 2012, 340 pages.

* cited by examiner

| Aggregation level= 1 | Aggregation level= 2 | Aggregation level= 4 | Aggregation level= 8 |
|---|---|---|---|
| PDCCH control signaling | | PDCCH control signaling | |
| PDCCH control signaling | | | |
| | | PDCCH control signaling | |
| | | | |

METHOD AND APPARATUS FOR SENDING DOWNLINK DATA IN A TIME-DOMAIN BUNDLING MANNER OR A FREQUENCY-DOMAIN BUNDLING MANNER

This application is a continuation of International Application No. PCT/CN2013/071518, filed on Feb. 7, 2013, which is hereby incorporated by reference in its entirety.

TECHNICAL FIELD

Embodiments of the present invention relate to communications technologies, and in particular, to a data transmission method and apparatus.

BACKGROUND

At present, a Long Term Evolution (Long Term Evolution, hereinafter referred to as LTE) system has been widely applied in the communications field. In the LTE system, downlink data that is sent to user equipment (User Equipment, hereinafter referred to as UE) by a base station may include PDSCH data transmitted on a physical downlink shared channel (Physical Downlink Shared Channel, hereinafter referred to as PDSCH) and PDCCH control signaling transmitted on a physical downlink control channel (Physical Downlink Control Channel, hereinafter referred to as PDCCH). The PDCCH control signaling may include a scheduling command, a power control command, a measurement reporting command, and the like.

The foregoing downlink data sent by the base station may not be capable of being correctly received by the UE. If no acknowledgment information from the UE is received within a period of time after the base station sends the downlink data, the base station may retransmit the same downlink data.

If a signal, from the base station, received by the UE is relatively weak, the base station may need to retransmit the downlink data including the PDCCH control signaling and the PDSCH data to the UE for multiple times. Such a manner of repeatedly retransmitting downlink data usually causes an excessive long delay to downlink data transmission. If the repeatedly retransmitted downlink data is a scheduling command used to schedule uplink/downlink data, an excessive long delay may also be caused to transmission of the scheduled uplink/downlink data. If the repeatedly retransmitted downlink data is a power control command or a measurement reporting command, problems such as that power of the UE is not adjusted in time and that a measurement is not reported in time may also be caused.

SUMMARY

Embodiments of the present invention provide a data transmission method and apparatus.

According to a first aspect, an embodiment of the present invention provides a data transmission method, including: generating a configuration message, where the configuration message is used to configure, for user equipment UE, a function of receiving downlink bundled data, and the downlink bundled data is downlink data that is repeatedly transmitted at least twice; and sending the configuration message to the UE and sending the downlink bundled data to the UE.

In a first possible implementation manner of the first aspect, the sending the downlink bundled data to the UE includes: sending the downlink bundled data to the UE according to a configuration parameter of the downlink bundled data, where the configuration parameter of the downlink bundled data includes at least one of the following parameters: a quantity of transmission times of same downlink data included in the downlink bundled data; a redundancy version rule corresponding to each piece of downlink data in the downlink bundled data; an uplink feedback resource used by the UE; a type of the downlink data in the downlink bundled data; a hybrid automatic repeat request process number; and a hybrid automatic repeat request round-trip time.

According to the first aspect or the first possible implementation manner of the first aspect, in a second possible implementation manner of the first aspect, the configuration message further includes one piece of the following indication information: first indication information used to indicate that a time-domain bundling manner is used for the downlink bundled data; second indication information used to indicate that a frequency-domain bundling manner is used for the downlink bundled data; and third indication information used to indicate that a time-domain bundling manner and a frequency-domain bundling manner are used for the downlink bundled data, where the time-domain bundling manner is a sending manner in which the downlink bundled data is repeatedly transmitted at least twice in a time domain, and the frequency-domain bundling manner is a sending manner in which the downlink bundled data is repeatedly transmitted at least twice in a frequency domain.

According to the second possible implementation manner of the first aspect, in a third possible implementation manner of the first aspect, if the time-domain bundling manner is used for the downlink bundled data, the sending the downlink bundled data to the UE includes: sending physical downlink shared channel PDSCH bundled data to the UE in at least two consecutive downlink transmission time intervals TTIs.

According to the third possible implementation manner of the first aspect, in a fourth possible implementation manner of the first aspect, the method further includes: sending physical downlink control channel PDCCH control signaling to the UE in a first TTI of the at least two TTIs; or sending PDCCH control signaling to the UE in at least two TTIs of the at least two TTIs.

According to the second possible implementation manner of the first aspect, in a fifth possible implementation manner of the first aspect, if the frequency-domain bundling manner is used for the downlink bundled data, the sending the downlink bundled data to the UE includes: sending PDSCH bundled data to the UE on at least two resource blocks in one TTI.

According to the fifth possible implementation manner of the first aspect, in a sixth possible implementation manner of the first aspect, the method further includes: sending PDCCH control signaling to the UE in the TTI.

According to the fifth or sixth possible implementation manner of the first aspect, in a seventh possible implementation manner of the first aspect, the configuration parameter of the downlink bundled data further includes frequency-domain resource indication information, where the frequency-domain resource indication information is used to indicate the at least two resource blocks used to transmit the PDSCH bundled data.

According to the second possible implementation manner of the first aspect, in an eighth possible implementation manner of the first aspect, the downlink bundled data is PDCCH bundling control signaling; and the sending the downlink bundled data to the UE includes: sending the PDCCH bundling control signaling to the UE.

According to the eighth possible implementation manner of the first aspect, in a ninth possible implementation manner of the first aspect, if the frequency-domain bundling manner is used for the PDCCH bundling control signaling, the sending the PDCCH bundling control signaling to the UE includes: sending the PDCCH bundling control signaling to the UE on at least two resource blocks of at least one aggregation level in one TTI.

According to the ninth possible implementation manner of the first aspect, in a tenth possible implementation manner of the first aspect, the configuration parameter of the downlink bundled data further includes aggregation level indication information, where the aggregation level indication information is used to indicate the at least one aggregation level used to transmit the PDCCH bundling control signaling and the resource blocks of the at least one aggregation level.

According to a second aspect, an embodiment of the present invention provides another data transmission method, including:

receiving a configuration message sent by a base station; enabling, according to the configuration message, a function of receiving downlink bundled data, where the downlink bundled data is downlink data that is repeatedly transmitted at least twice; and receiving downlink bundled data sent by the base station.

In a first possible implementation manner of the second aspect, the receiving downlink bundled data sent by the base station includes: receiving, according to a configuration parameter of the downlink bundled data, the downlink bundled data sent by the base station, where the configuration parameter of the downlink bundled data includes at least one of the following parameters: a quantity of transmission times of same downlink data included in the downlink bundled data; a redundancy version rule corresponding to each piece of downlink data in the downlink bundled data; an uplink feedback resource used by the UE; a type of the downlink data in the downlink bundled data; a hybrid automatic repeat request process number; and a hybrid automatic repeat request round-trip time.

According to the second aspect or the first possible implementation manner of the second aspect, in a second possible implementation manner of the second aspect, the configuration message further includes one piece of the following indication information: first indication information used to indicate that a time-domain bundling manner is used for the downlink bundled data; second indication information used to indicate that a frequency-domain bundling manner is used for the downlink bundled data; and third indication information used to indicate that a time-domain bundling manner and a frequency-domain bundling manner are used for the downlink bundled data, where the time-domain bundling manner is a sending manner in which the downlink bundled data is repeatedly transmitted at least twice in a time domain, and the frequency-domain bundling manner is a sending manner in which the downlink bundled data is repeatedly transmitted at least twice in a frequency domain.

According to the second possible implementation manner of the second aspect, in a third possible implementation manner of the second aspect, if the time-domain bundling manner is used for the downlink bundled data, the receiving downlink bundled data sent by the base station includes: receiving, in at least two consecutive downlink transmission time intervals TTIs, physical downlink shared channel PDSCH bundled data sent by the base station.

According to the third possible implementation manner of the second aspect, in a fourth possible implementation manner of the second aspect, the method further includes: receiving, in a first TTI of the at least two TTIs, physical downlink control channel PDCCH control signaling sent by the base station; or receiving, in at least two TTIs of the at least two TTIs, PDCCH control signaling sent by the base station.

According to the second possible implementation manner of the second aspect, in a fifth possible implementation manner of the second aspect, if the frequency-domain bundling manner is used for the downlink bundled data, the receiving downlink bundled data sent by the base station includes: receiving, on at least two resource blocks in one TTI, PDSCH bundled data sent by the base station.

According to the fifth possible implementation manner of the second aspect, in a sixth possible implementation manner of the second aspect, the method further includes: receiving, in the TTI, PDCCH control signaling sent by the base station.

According to the fifth or sixth possible implementation manner of the second aspect, in a seventh possible implementation manner of the second aspect, the configuration parameter of the downlink bundled data further includes frequency-domain resource indication information, where the frequency-domain resource indication information is used to indicate the at least two resource blocks used to transmit the PDSCH bundled data; and the receiving, on at least two resource blocks in one TTI, PDSCH bundled data sent by the base station includes: receiving, on the at least two resource blocks in the one TTI according to the frequency-domain resource indication information, the PDSCH bundled data sent by the base station.

According to the second possible implementation manner of the second aspect, in an eighth possible implementation manner of the second aspect, the downlink bundled data is PDCCH bundling control signaling; and the receiving downlink bundled data sent by the base station includes: receiving the PDCCH bundling control signaling sent by the base station.

According to the eighth possible implementation manner of the second aspect, in a ninth possible implementation manner of the second aspect, if the frequency-domain bundling manner is used for the PDCCH bundling control signaling, the receiving the PDCCH bundling control signaling sent by the base station includes: receiving, on at least two resource blocks of at least one aggregation level in one TTI, the PDCCH bundling control signaling sent by the base station.

According to the ninth possible implementation manner of the second aspect, in a tenth possible implementation manner of the second aspect, the configuration parameter of the downlink bundled data further includes aggregation level indication information, where the aggregation level indication information is used to indicate the at least one aggregation level used to transmit the PDCCH bundling control signaling and the resource blocks of the at least one aggregation level; and the receiving, on at least two resource blocks of at least one aggregation level in one TTI, the PDCCH bundling control signaling sent by the base station includes: receiving, at a corresponding aggregation level and on a resource block of the aggregation level, the PDCCH bundling control signaling according to the aggregation level indication information.

According to a third aspect, an embodiment of the present invention provides a data transmission apparatus, including:

a configuration message generating module, configured to generate a configuration message, where the configuration message is used to configure, for user equipment UE, a function of receiving downlink bundled data, and the downlink bundled data is downlink data that is repeatedly transmitted at least twice; and a sending module, configured to send the configuration message generated by the configuration message generating module to the UE and send the downlink bundled data to the UE.

In a first possible implementation manner of the third aspect, the sending module is specifically configured to send the downlink bundled data to the UE according to a configuration parameter of the downlink bundled data, where the configuration parameter of the downlink bundled data includes at least one of the following parameters: a quantity of transmission times of same downlink data included in the downlink bundled data; a redundancy version rule corresponding to each piece of downlink data in the downlink bundled data; an uplink feedback resource used by the UE; a type of the downlink data in the downlink bundled data; a hybrid automatic repeat request process number; and a hybrid automatic repeat request round-trip time.

According to the third aspect or the first possible implementation manner of the third aspect, in a second possible implementation manner of the third aspect, the configuration message generated by the configuration message generating module further includes one piece of the following indication information: first indication information used to indicate that a time-domain bundling manner is used for the downlink bundled data; second indication information used to indicate that a frequency-domain bundling manner is used for the downlink bundled data; and third indication information used to indicate that a time-domain bundling manner and a frequency-domain bundling manner are used for the downlink bundled data, where the time-domain bundling manner is a sending manner in which the downlink bundled data is repeatedly transmitted at least twice in a time domain, and the frequency-domain bundling manner is a sending manner in which the downlink bundled data is repeatedly transmitted at least twice in a frequency domain.

According to the second possible implementation manner of the third aspect, in a third possible implementation manner of the third aspect, if the time-domain bundling manner is used for the downlink bundled data, the sending module is specifically configured to send physical downlink shared channel PDSCH bundled data to the UE in at least two consecutive downlink transmission time intervals TTIs.

According to the third possible implementation manner of the third aspect, in a fourth possible implementation manner of the third aspect, the sending module is further configured to: send physical downlink control channel PDCCH control signaling to the UE in a first TTI of the at least two TTIs; or send PDCCH control signaling to the UE in at least two TTIs of the at least two TTIs.

According to the second possible implementation manner of the third aspect, in a fifth possible implementation manner of the third aspect, if the frequency-domain bundling manner is used for the downlink bundled data, the sending module is specifically configured to send PDSCH bundled data to the UE on at least two resource blocks in one TTI.

According to the fifth possible implementation manner of the third aspect, in a sixth possible implementation manner of the third aspect, the sending module is further configured to send PDCCH control signaling to the UE in the TTI.

According to the fifth or sixth possible implementation manner of the third aspect, in a seventh possible implementation manner of the third aspect, the configuration parameter of the downlink bundled data further includes frequency-domain resource indication information, where the frequency-domain resource indication information is used to indicate the at least two resource blocks used to transmit the PDSCH bundled data.

According to the second possible implementation manner of the third aspect, in an eighth possible implementation manner of the third aspect, the downlink bundled data is PDCCH bundling control signaling; and the sending module is specifically configured to send the PDCCH bundling control signaling to the UE.

According to the eighth possible implementation manner of the third aspect, in a ninth possible implementation manner of the third aspect, if the frequency-domain bundling manner is used for the PDCCH bundling control signaling, the sending module is specifically configured to send the PDCCH bundling control signaling to the UE on at least two resource blocks of at least one aggregation level in one TTI.

According to the ninth possible implementation manner of the third aspect, in a tenth possible implementation manner of the third aspect, the configuration parameter of the downlink bundled data further includes aggregation level indication information, where the aggregation level indication information is used to indicate the at least one aggregation level used to transmit the PDCCH bundling control signaling and the resource blocks of the at least one aggregation level.

According to a fourth aspect, an embodiment of the present invention provides another data transmission apparatus, including:

a receiving module, configured to receive a configuration message sent by a base station; and a function enabling module, configured to enable, according to the configuration message received by the receiving module, a function of receiving downlink bundled data, where the downlink bundled data is downlink data that is repeatedly transmitted at least twice, where the receiving module is further configured to receive downlink bundled data sent by the base station.

In a first possible implementation manner of the fourth aspect, the receiving module is specifically configured to receive, according to a configuration parameter of the downlink bundled data, the downlink bundled data sent by the base station, where the configuration parameter of the downlink bundled data includes at least one of the following parameters: a quantity of transmission times of same downlink data included in the downlink bundled data; a redundancy version rule corresponding to each piece of downlink data in the downlink bundled data; an uplink feedback resource used by the UE; a type of the downlink data in the downlink bundled data; a hybrid automatic repeat request process number; and a hybrid automatic repeat request round-trip time.

According to the fourth aspect or the first possible implementation manner of the fourth aspect, in a second possible implementation manner of the fourth aspect, the configuration message received by the receiving module further includes one piece of the following indication information: first indication information used to indicate that a time-domain bundling manner is used for the downlink bundled data; second indication information used to indicate that a frequency-domain bundling manner is used for the downlink bundled data; and third indication information used to indicate that a time-domain bundling manner and a frequency-domain bundling manner are used for the downlink bundled data, where the time-domain bundling manner is a sending manner in which the downlink bundled data is repeatedly transmitted at least twice in a time domain, and the frequency-domain bundling manner is a sending manner in which the downlink bundled data is repeatedly transmitted at least twice in a frequency domain.

According to the second possible implementation manner of the fourth aspect, in a third possible implementation manner of the fourth aspect, if the time-domain bundling manner is used for the downlink bundled data, the receiving module is specifically configured to receive, in at least two consecutive downlink transmission time intervals TTIs, physical downlink shared channel PDSCH bundled data sent by the base station.

According to the third possible implementation manner of the fourth aspect, in a fourth possible implementation manner of the fourth aspect, the receiving module is further configured to: receive, in a first TTI of the at least two TTIs, physical downlink control channel PDCCH control signaling sent by the base station; or receive, in at least two TTIs of the at least two TTIs, PDCCH control signaling sent by the base station.

According to the second possible implementation manner of the fourth aspect, in a fifth possible implementation manner of the fourth aspect, if the frequency-domain bundling manner is used for the downlink bundled data, the receiving module is specifically configured to receive, on at least two resource blocks in one TTI, PDSCH bundled data sent by the base station.

According to the fifth possible implementation manner of the fourth aspect, in a sixth possible implementation manner of the fourth aspect, the receiving module is further configured to receive, in the TTI, PDCCH control signaling sent by the base station.

According to the fifth or sixth possible implementation manner of the fourth aspect, in a seventh possible implementation manner of the fourth aspect, the configuration parameter of the downlink bundled data further includes frequency-domain resource indication information, where the frequency-domain resource indication information is used to indicate the at least two resource blocks used to transmit the PDSCH bundled data; and the receiving module is specifically configured to receive, on the at least two resource blocks in the one TTI according to the frequency-domain resource indication information, the PDSCH bundled data sent by the base station.

According to the second possible implementation manner of the fourth aspect, in an eighth possible implementation manner of the fourth aspect, the downlink bundled data is PDCCH bundling control signaling; and the receiving module is specifically configured to receive the PDCCH bundling control signaling sent by the base station.

According to the eighth possible implementation manner of the fourth aspect, in a ninth possible implementation manner of the fourth aspect, if the frequency-domain bundling manner is used for the PDCCH bundling control signaling, the receiving module is specifically configured to receive, on at least two resource blocks of at least one aggregation level in one TTI, the PDCCH bundling control signaling sent by the base station.

According to the ninth possible implementation manner of the fourth aspect, in a tenth possible implementation manner of the fourth aspect, the configuration parameter of the downlink bundled data further includes aggregation level indication information, where the aggregation level indication information is used to indicate the at least one aggregation level used to transmit the PDCCH bundling control signaling and the resource blocks of the at least one aggregation level; and the receiving module is specifically configured to receive, at a corresponding aggregation level and on a resource block of the aggregation level, the PDCCH bundling control signaling according to the aggregation level indication information.

According to a fifth aspect, an embodiment of the present invention provides a base station, including:

a processor, configured to generate a configuration message, where the configuration message is used to configure, for user equipment UE, a function of receiving downlink bundled data, and the downlink bundled data is downlink data that is repeatedly transmitted at least twice; and a transmitter, configured to send the configuration message generated by the processor to the UE and send the downlink bundled data to the UE.

In a first possible implementation manner of the fifth aspect, the transmitter is specifically configured to send the downlink bundled data to the UE according to a configuration parameter of the downlink bundled data, where the configuration parameter of the downlink bundled data includes at least one of the following parameters: a quantity of transmission times of same downlink data included in the downlink bundled data; a redundancy version rule corresponding to each piece of downlink data in the downlink bundled data; an uplink feedback resource used by the UE; a type of the downlink data in the downlink bundled data; a hybrid automatic repeat request process number; and a hybrid automatic repeat request round-trip time.

According to the fifth aspect or the first possible implementation manner of the fifth aspect, in a second possible implementation manner of the fifth aspect, the configuration message generated by the processor further includes one piece of the following indication information: first indication information used to indicate that a time-domain bundling manner is used for the downlink bundled data; second indication information used to indicate that a frequency-domain bundling manner is used for the downlink bundled data; and third indication information used to indicate that a time-domain bundling manner and a frequency-domain bundling manner are used for the downlink bundled data, where the time-domain bundling manner is a sending manner in which the downlink bundled data is repeatedly transmitted at least twice in a time domain, and the frequency-domain bundling manner is a sending manner in which the downlink bundled data is repeatedly transmitted at least twice in a frequency domain.

According to the second possible implementation manner of the fifth aspect, in a third possible implementation manner of the fifth aspect, if the time-domain bundling manner is used for the downlink bundled data, the transmitter is specifically configured to send physical downlink shared channel PDSCH bundled data to the UE in at least two consecutive downlink transmission time intervals TTIs.

According to the third possible implementation manner of the fifth aspect, in a fourth possible implementation manner of the fifth aspect, the transmitter is further configured to: send physical downlink control channel PDCCH control signaling to the UE in a first TTI of the at least two TTIs; or send PDCCH control signaling to the UE in at least two TTIs of the at least two TTIs.

According to the second possible implementation manner of the fifth aspect, in a fifth possible implementation manner of the fifth aspect, if the frequency-domain bundling manner is used for the downlink bundled data, the transmitter is specifically configured to send PDSCH bundled data to the UE on at least two resource blocks in one TTI.

According to the fifth possible implementation manner of the fifth aspect, in a sixth possible implementation manner of the fifth aspect, the transmitter is further configured to send PDCCH control signaling to the UE in the TTI.

According to the fifth or sixth possible implementation manner of the fifth aspect, in a seventh possible implementation manner of the fifth aspect, the configuration parameter of the downlink bundled data further includes frequency-domain resource indication information, where the frequency-domain resource indication information is used to indicate the at least two resource blocks used to transmit the PDSCH bundled data.

According to the second possible implementation manner of the fifth aspect, in an eighth possible implementation manner of the fifth aspect, the downlink bundled data is PDCCH bundling control signaling; and the transmitter is specifically configured to send the PDCCH bundling control signaling to the UE.

According to the eighth possible implementation manner of the fifth aspect, in a ninth possible implementation manner of the fifth aspect, if the frequency-domain bundling manner is used for the PDCCH bundling control signaling, the transmitter is specifically configured to send the PDCCH bundling control signaling to the UE on at least two resource blocks of at least one aggregation level in one TTI.

According to the ninth possible implementation manner of the fifth aspect, in a tenth possible implementation manner of the fifth aspect, the configuration parameter of the downlink bundled data further includes aggregation level indication information, where the aggregation level indication information is used to indicate the at least one aggregation level used to transmit the PDCCH bundling control signaling and the resource blocks of the at least one aggregation level.

According to a sixth aspect, an embodiment of the present invention provides user equipment, including:

a receiver, configured to receive a configuration message sent by a base station; and a processor, configured to enable, according to the configuration message received by the receiver, a function of receiving downlink bundled data, where the downlink bundled data is downlink data that is repeatedly transmitted at least twice, where the receiver is further configured to receive downlink bundled data sent by the base station.

In a first possible implementation manner of the sixth aspect, the receiver is specifically configured to receive, according to a configuration parameter of the downlink bundled data, the downlink bundled data sent by the base station, where the configuration parameter of the downlink bundled data includes at least one of the following parameters: a quantity of transmission times of same downlink data included in the downlink bundled data; a redundancy version rule corresponding to each piece of downlink data in the downlink bundled data; an uplink feedback resource used by the UE; a type of the downlink data in the downlink bundled data; a hybrid automatic repeat request process number; and a hybrid automatic repeat request round-trip time.

According to the sixth aspect or the first possible implementation manner of the sixth aspect, in a second possible implementation manner of the sixth aspect, the configuration message received by the receiver further includes one piece of the following indication information: first indication information used to indicate that a time-domain bundling manner is used for the downlink bundled data; second indication information used to indicate that a frequency-domain bundling manner is used for the downlink bundled data; and third indication information used to indicate that a time-domain bundling manner and a frequency-domain bundling manner are used for the downlink bundled data, where the time-domain bundling manner is a sending manner in which the downlink bundled data is repeatedly transmitted at least twice in a time domain, and the frequency-domain bundling manner is a sending manner in which the downlink bundled data is repeatedly transmitted at least twice in a frequency domain.

According to the second possible implementation manner of the sixth aspect, in a third possible implementation manner of the sixth aspect, if the time-domain bundling manner is used for the downlink bundled data, the receiver is specifically configured to receive, in at least two consecutive downlink transmission time intervals TTIs, physical downlink shared channel PDSCH bundled data sent by the base station.

According to the third possible implementation manner of the sixth aspect, in a fourth possible implementation manner of the sixth aspect, the receiver is further configured to: receive, in a first TTI of the at least two TTIs, physical downlink control channel PDCCH control signaling sent by the base station; or receive, in at least two TTIs of the at least two TTIs, PDCCH control signaling sent by the base station.

According to the second possible implementation manner of the sixth aspect, in a fifth possible implementation manner of the sixth aspect, if the frequency-domain bundling manner is used for the downlink bundled data, the receiver is specifically configured to receive, on at least two resource blocks in one TTI, PDSCH bundled data sent by the base station.

According to the fifth possible implementation manner of the sixth aspect, in a sixth possible implementation manner of the sixth aspect, the receiver is further configured to receive, in the TTI, PDCCH control signaling sent by the base station.

According to the fifth or sixth possible implementation manner of the sixth aspect, in a seventh possible implementation manner of the sixth aspect, the configuration parameter of the downlink bundled data further includes frequency-domain resource indication information, where the frequency-domain resource indication information is used to indicate the at least two resource blocks used to transmit the PDSCH bundled data; and the receiver is specifically configured to receive, on the at least two resource blocks in the one TTI according to the frequency-domain resource indication information, the PDSCH bundled data sent by the base station.

According to the second possible implementation manner of the sixth aspect, in an eighth possible implementation manner of the sixth aspect, the downlink bundled data is PDCCH bundling control signaling; and the receiver is specifically configured to receive the PDCCH bundling control signaling sent by the base station.

According to the eighth possible implementation manner of the sixth aspect, in a ninth possible implementation manner of the sixth aspect, if the frequency-domain bundling manner is used for the PDCCH bundling control signaling, the receiver is specifically configured to receive, on at least two resource blocks of at least one aggregation level in one TTI, the PDCCH bundling control signaling sent by the base station.

According to the ninth possible implementation manner of the sixth aspect, in a tenth possible implementation manner of the sixth aspect, the configuration parameter of the downlink bundled data further includes aggregation level indication information, where the aggregation level indication information is used to indicate the at least one aggregation level used to transmit the PDCCH bundling control signaling and the resource blocks of the at least one aggregation level; and the receiver is specifically configured to receive, at a corresponding aggregation level and on a resource block of the aggregation level, the PDCCH bundling control signaling according to the aggregation level indication information.

According to the data transmission method and apparatus provided in the embodiments of the present invention, downlink data is sent to user equipment in a downlink bundling (Bundling) manner, thereby improving reliability of downlink data transmission and shortening a delay of downlink data transmission. If the downlink data is a scheduling command used to schedule uplink data, reliability of transmitting the scheduling command can also be improved and a delay for transmitting the scheduled uplink data can also be shortened. If the downlink data is PDCCH control signaling such as a power control command or a measurement reporting command, reliability of transmitting the PDCCH control signaling can also be improved, and timeliness of power adjustment and measurement reporting performed by the user equipment can also be ensured. Further, a function of receiving downlink bundled data is flexibly configured and enabled for the UE, thereby preventing the UE from receiving, in all scenarios, the downlink data in a manner of receiving the downlink bundled data.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
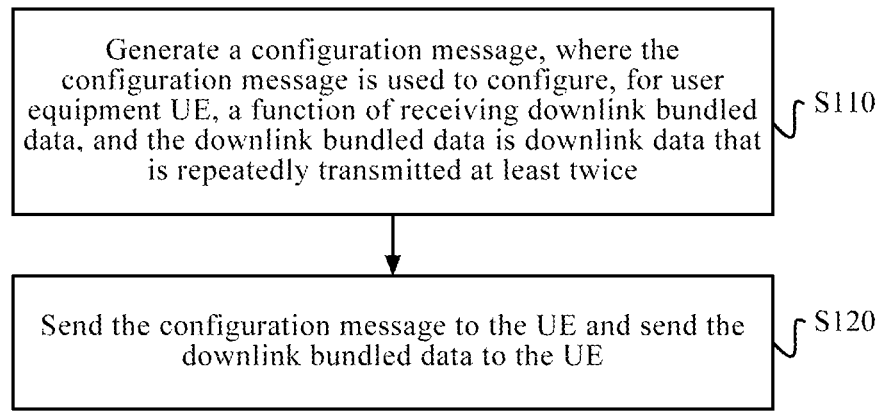
FIG. 1 is a flowchart of Embodiment 1 of a data transmission method according to the present invention.

FIG. 1 is a flowchart of Embodiment 1 of a data transmission method according to the present invention. As shown in FIG. 1, in this embodiment, the data transmission method is described by using a base station as an execution body. The method may include:

S110: Generate a configuration message, where the configuration message is used to configure, for user equipment UE, a function of receiving downlink bundled data, and the downlink bundled data is downlink data that is repeatedly transmitted at least twice.

Specifically, the foregoing at least twice of repeated transmission may be repeated transmission on consecutive time-domain resources, may be repeated transmission on consecutive frequency-domain resources, or may be a combination of the foregoing two manners of repeated transmission.

The base station may send the configuration message to the UE by using a Radio Resource Control (Radio Resource Control, hereinafter referred to as RRC) protocol message. The RRC message may be a downlink RRC message such as an RRC connection setup (RRC Connection Setup) message or an RRC connection reconfiguration (RRC Connection Reconfiguration) message. In addition, a Media Access Control (Media Access Control, hereinafter referred to as MAC) message such as a MAC control element, or a physical layer message such as PDCCH control signaling may also be used to send the configuration message to the UE. This embodiment of the present invention imposes no limitation on a manner of sending the configuration message.

The configuration message is used to configure, for the UE, the function of receiving the downlink bundled (Bundling) data. After receiving the configuration message, the UE enables the function of receiving the downlink bundled data. The downlink bundled data is downlink data that is repeatedly transmitted at least twice. After enabling the function of receiving the downlink bundled data, the UE may acquire correct downlink data by receiving and parsing the downlink data that is repeatedly transmitted at least twice. Certainly, if the UE can correctly parse the downlink data after receiving the downlink data that is transmitted once in the downlink bundled data, the downlink data that is subsequently transmitted in the downlink bundled data may also be ignored.

The downlink data includes all data transmitted on a downlink channel, and may be PDCCH control signaling or PDSCH data. The PDCCH control signaling includes a scheduling command used to schedule uplink data, a power control command used to control power adjustment by the UE, a measurement reporting command used to instruct the UE to perform measurement reporting, or the like.

After receiving the configuration message, the UE may return a corresponding configuration complete message to the base station. If the configuration message is an RRC connection setup (RRC Connection Setup) message, the UE returns an RRC connection setup complete (RRC Connection Setup Complete) message. If the configuration message is an RRC connection reconfiguration (RRC Connection Reconfiguration) message, the UE returns an RRC connection reconfiguration complete (RRC Connection Reconfiguration Complete) message. If the configuration message is another downlink RRC message, the UE also returns a corresponding complete message, and this embodiment of the present invention imposes no limitation thereon.

S120: Send the configuration message to the UE and send the downlink bundled data to the UE.

The base station sends the configuration message to the UE, so that the UE enables the function of receiving the downlink bundled data. Moreover, the base station sends multiple pieces of same downlink data to the UE in a bundling manner, so that the UE acquires complete downlink data by parsing the bundled multiple pieces of downlink data including same content.

According to the data transmission method provided in this embodiment, a base station sends downlink data to UE in a downlink bundling manner, thereby improving reliability of downlink data transmission and shortening a delay of downlink data transmission. If the downlink data is a scheduling command used to schedule uplink data, reliability of transmitting the scheduling command can also be improved and a delay for transmitting the scheduled uplink data can also be shortened. If the downlink data is PDCCH control signaling such as a power control command or a measurement reporting command, reliability of transmitting the PDCCH control signaling can also be improved, and timeliness of power adjustment and measurement reporting performed by the user equipment can also be ensured. Further, a function of receiving downlink bundled data is flexibly configured and enabled for the UE, thereby preventing the UE from receiving, in all scenarios, the downlink data in a manner of receiving the downlink bundled data.

Further, the configuration message may further include a configuration parameter of the downlink bundled data; or a system broadcast message sent to the UE includes a configuration parameter of the downlink bundled data; or PDCCH control signaling sent to the UE includes a configuration parameter of the downlink bundled data. In short, the base station may further send the configuration parameter of the downlink bundled data to the UE by using the configuration message, the broadcast message, or the PDCCH control signaling. The configuration parameter of the downlink bundled data may also be predefined in the base station and the UE.

Further, the sending the downlink bundled data to the UE includes: sending the downlink bundled data to the UE according to the configuration parameter of the downlink bundled data, where the configuration parameter of the downlink bundled data includes at least one of the following parameters: a quantity of transmission times of same downlink data included in the downlink bundled data; a redundancy version rule corresponding to each piece of downlink data in the downlink bundled data; an uplink feedback resource used by the UE; a type of the downlink data in the downlink bundled data; a hybrid automatic repeat request (Hybrid Automatic Repeat reQuest, hereinafter referred to as HARQ) process number; and a hybrid automatic repeat request round-trip time (Round-Trip Time, hereinafter referred to as RTT). Specifically:

The quantity of transmission times of the same downlink data included in the downlink bundled data may be understood as a quantity of pieces of downlink data, included in the downlink bundled data, with same content, for example, 4 pieces of same downlink data may be included.

According to a redundancy version (Redundancy Version, hereinafter referred to as RV) rule corresponding to each piece of downlink data in the downlink bundled data, for example, if the downlink bundled data includes 4 pieces of same downlink data, RV=0 may be used for a first piece of downlink data, and RVs 2, 3, and 1 may be used for second to fourth pieces of downlink data respectively, or a use sequence of RVs is preset as 0, 2, 3, and 1, and an RV used for a first piece of downlink data in the downlink bundled data is explicitly notified to the UE by the base station in a scheduling command, so that the UE can learn an RV used for each piece of downlink data in the downlink bundled data, or before transmitting the downlink bundled data each time, the base station may also notify, by using PDCCH control signaling, the UE of an RV used for each piece of downlink data in the downlink bundled data transmitted this time. This embodiment of the present invention imposes no limitation on a manner of notifying an RV corresponding to downlink data transmitted each time in the downlink bundled data.

A rule may be preset for the uplink feedback resource used by the UE. For example, the uplink feedback resource may be mapped in advance to a downlink resource occupied by PDCCH control signaling used to schedule transmission of the downlink bundled data, which may specifically be: Uplink feedback resource=Start position of a resource occupied by PDCCH control signaling+Offset. A specific preset manner is not limited thereto.

Further, the configuration parameter of the downlink bundled data may further include that a type of the downlink data transmitted by using the downlink bundled data is PDSCH data, PDCCH control signaling, or a combination thereof. The PDCCH control signaling includes one or more of an uplink data scheduling command, a downlink data scheduling command, a power control command, a measurement reporting command, and the like, and may further include other control signaling transmitted on a PDCCH, which is not limited in this embodiment of the present invention.

Optionally, the type of the downlink data transmitted by using the downlink bundled data may be preconfigured. For example, it is preconfigured that the PDSCH data is transmitted by means of the downlink bundled data, or it is preconfigured that the PDCCH control signaling is transmitted by means of the downlink bundled data, or it is preconfigured that both the PDSCH data and the PDCCH control signaling are transmitted by means of the downlink bundled data.

Optionally, the configuration parameter of the downlink data may further include one or more of the following: a type of the downlink data transmitted by using the downlink bundled data is PDSCH data, a type of the downlink data transmitted by using the downlink bundled data is an uplink data scheduling command, a type of the downlink data transmitted by using the downlink bundled data is a PDSCH data scheduling command, a type of the downlink data transmitted by using the downlink bundled data is a power control command, or a type of the downlink data transmitted by using the downlink bundled data is a measurement command.

Optionally, the type of the downlink data transmitted by using a downlink bundling function may be preconfigured. For example, it is preconfigured that the PDSCH data is transmitted by means of the downlink bundled data, or it is preconfigured that the uplink data scheduling command is transmitted by means of the downlink bundled data, or it is preconfigured that the PDSCH data scheduling command is transmitted by means of the downlink bundled data, or it is preconfigured that the power control command is transmitted by means of the downlink bundled data, or it is preconfigured that the measurement command is transmitted by means of the downlink bundled data.

Further, the configuration message further includes one piece of the following indication information: first indication information used to indicate that a time-domain bundling manner is used for the downlink bundled data; second indication information used to indicate that a frequency-domain bundling manner is used for the downlink bundled data; and third indication information used to indicate that a time-domain bundling manner and a frequency-domain bundling manner are used for the downlink bundled data, where the time-domain bundling manner is a sending manner in which the downlink bundled data is repeatedly transmitted at least twice in a time domain, and the frequency-domain bundling manner is a sending manner in which the downlink bundled data is repeatedly transmitted at least twice in a frequency domain. That is, the base station may transmit multiple pieces of same downlink data in different time domains in a bundling manner, may transmit multiple pieces of same downlink data in different frequency domains in a bundling manner, or may transmit multiple pieces of same downlink data in different time domains and different frequency domains in a bundling manner. The base station may make it clear to the UE a downlink data bundling manner according to the configuration message or a scheduling command, or a downlink data bundling manner may be preset or specified in a protocol.

Figure 2:
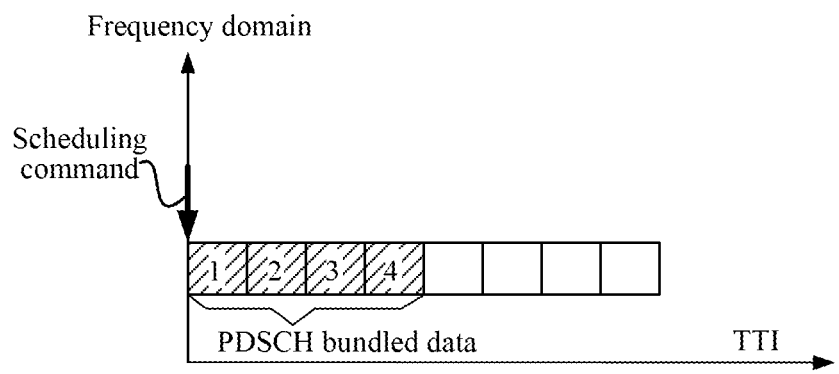
FIG. 2 is a schematic diagram of Embodiment 2 of a data transmission method according to the present invention.

Further, if the time-domain bundling manner is used for the downlink bundled data, the sending the downlink bundled data to the UE includes: sending physical downlink shared channel PDSCH bundled data to the UE in at least two consecutive downlink transmission time intervals (Transmission Time Interval, hereinafter referred to as TTI). Certainly, the PDSCH bundled data may also be sent to the UE in inconsecutive downlink TTIs, which is not limited herein. When it is configured that the time-domain bundling manner is used for the PDSCH bundled data, the PDCCH control signaling, namely, a scheduling command for scheduling the PDSCH bundled data, is sent to the UE in a first TTI of the at least two consecutive downlink TTIs; or the scheduling command is sent to the UE in at least two TTIs. Specifically:

FIG. 2 is a schematic diagram of Embodiment 2 of the data transmission method according to the present invention. As shown in FIG. 2, the PDSCH bundled data in this embodiment is sent in the time-domain bundling manner. The base station sends a scheduling command to the UE in a first TTI to schedule the UE to receive the PDSCH bundled data, where the scheduling command may include the foregoing configuration parameter of the downlink bundled data. After learning the configuration parameter of the downlink bundled data, the UE may receive four pieces of same PDSCH data that are separately transmitted by the base station in four TTIs, namely, TTI 1 to TTI 4. The four pieces of same PDSCH data may use different RVs together to constitute the PDSCH bundled data. After receiving the PDSCH bundled data, the UE parses and acquires content of the PDSCH bundled data according to the configuration parameter of the downlink bundled data. Certainly, the UE may also parse one or more pieces of PDSCH data in the PDSCH bundled data, and acquire the content of the PDSCH bundled data. For example, the UE may first parse a first piece of PDSCH data in the PDSCH bundled data. If the parsing is successful and the content is acquired, the UE may no longer parse subsequent PDSCH data in the PDSCH bundled data. If the parsing is unsuccessful, the UE then parses a second, third, or fourth piece of PDSCH data, or together parses one or more pieces of PDSCH data in the PDSCH bundled data. A specific parsing manner is not limited herein.

Figure 3:
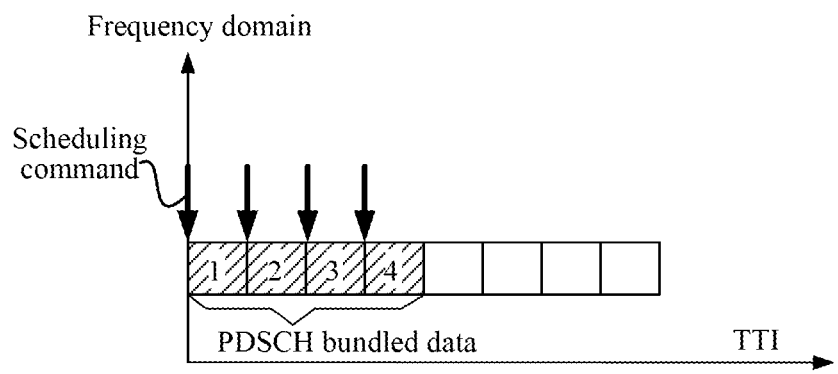
FIG. 3 is a schematic diagram of Embodiment 3 of a data transmission method according to the present invention.

FIG. 3 is a schematic diagram of Embodiment 3 of the data transmission method according to the present invention. As shown in FIG. 3, the PDSCH bundled data in this embodiment is also sent in the time-domain bundling manner, but the base station sends four scheduling commands to the UE in four TTIs, namely, TTI 1 to TTI 4 separately, so as to schedule the UE to receive the PDSCH bundled data. The UE may further continue to parse scheduling commands in last three TTIs even if a scheduling command in a first TTI is not parsed out successfully. The base station may indicate, in the scheduling command, that the scheduling command is which scheduling command within the PDSCH bundled data, so as to enable the UE to clearly know the quantity of same scheduling commands to be transmitted subsequently. Further optionally, after the UE parses out one scheduling command in the PDSCH bundled data, the UE may no longer detect subsequent scheduling commands, and receive the PDSCH bundled data according to the scheduling command parsed out. In this embodiment of the present invention, a specific TTI and a quantity of times for sending a scheduling command may be flexibly selected as required. For example, the scheduling command may also be sent in first two TTIs or in first three TTIs, which is not limited thereto.

Likewise, the scheduling command may include the foregoing configuration parameter of the downlink bundled data. After learning the configuration parameter of the downlink bundled data, the UE may receive four pieces of PDSCH data with same content that are separately transmitted by the base station in the four TTIs. The four pieces of same PDSCH data may use different RVs together to constitute the PDSCH bundled data. After receiving the PDSCH bundled data, the UE parses and acquires content of the PDSCH bundled data according to the configuration parameter of the downlink bundled data.

A manner of sending multiple scheduling commands in multiple TTIs can improve reliability of scheduling command transmission, thereby shortening a delay for transmitting data scheduled by using the scheduling commands.

Figures 4, 5:
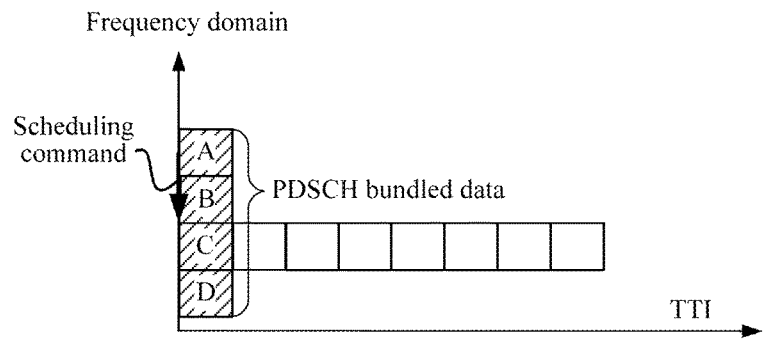
FIG. 4 is a schematic diagram of Embodiment 4 of a data transmission method according to the present invention.
FIG. 5 is a schematic diagram of Embodiment 5 of a data transmission method according to the present invention.

Further, if the frequency-domain bundling manner is used for the downlink bundled data, the sending the downlink bundled data to the UE includes: sending PDSCH bundled data to the UE on at least two resource blocks in one TTI, where a scheduling command used to schedule the PDSCH bundled data may be sent to the UE once in the TTI, may be sent multiple times in different frequency domains in the TTI, or may be sent to the UE before the TTI. The configuration parameter of the downlink bundled data may further include frequency-domain resource indication information, where the frequency-domain resource indication information is used to indicate the at least two resource blocks used to transmit the PDSCH bundled data. Specifically:

FIG. 4 is a schematic diagram of Embodiment 4 of the data transmission method according to the present invention. As shown in FIG. 4, the PDSCH bundled data in this embodiment is sent in the frequency-domain bundling manner. The base station may transmit four pieces of PDSCH data with same content on four resource blocks A, B, C, and D in a same TTI separately. The four pieces of PDSCH data with the same content may use different RVs together to constitute the PDSCH bundled data. After receiving the PDSCH bundled data, the UE parses and acquires content of the PDSCH bundled data according to the configuration parameter of the downlink bundled data. A scheduling command used to configure the UE to receive the PDSCH bundled data may also be sent in the TTI. The scheduling command may further include frequency-domain resource indication information, instructing the UE to receive the PDSCH bundled data in a corresponding frequency domain. The frequency-domain resource indication information may specify that: a resource position allocated in the scheduling command is used as a start point, a size is used as a unit, and multiple consecutive resource blocks of a same size are used to send the PDSCH bundled data. Certainly, the PDSCH bundled data may also be sent by using multiple inconsecutive resource blocks or in another frequency-domain resource use manner, and this embodiment of the present invention imposes no limitation thereon. Optionally, a frequency-domain resource use manner may also be indicated or preconfigured in the configuration message. For example, it is indicated in the configuration message whether consecutive resource blocks or inconsecutive resource blocks are used to send the PDSCH bundled data. If inconsecutive resource blocks are used, information such as a spacing between adjacent resource blocks may be further included, and no limitation is imposed thereon.

Relative to sending downlink data in the time-domain bundling manner, sending downlink data in the frequency-domain bundling manner may further reduce a data transmission delay.

Based on the embodiments in FIG. 2 to FIG. 4, the foregoing time-domain bundling manner and frequency-domain bundling manner may be used in a combined manner. For example, the downlink bundled data may be four pieces of same downlink data that are respectively transmitted on two resource blocks in a first TTI and on two resource blocks in a second TTI.

In the embodiments shown in FIG. 2 to FIG. 4, the data transmission method provided in the embodiments of the present invention is described by using an example in which the downlink bundled data is downlink data that is repeatedly transmitted four times. However, a quantity of times of repeatedly transmitting downlink data in the downlink bundled data in the embodiments of the present invention may be flexibly selected according to different scenarios, and no limitation is imposed thereon.

Further, the downlink bundled data is PDCCH bundling control signaling; and the sending the downlink bundled data to the UE includes: sending the PDCCH bundling control signaling to the UE. Further, if the frequency-domain bundling manner is used for the PDCCH bundling control signaling, the sending the PDCCH bundling control signaling to the UE includes: sending the PDCCH bundling control signaling to the UE on at least two resource blocks of at least one aggregation level in one TTI. The configuration parameter of the downlink bundled data further includes aggregation level indication information, where the aggregation level indication information is used to indicate the at least one aggregation level used to transmit the PDCCH bundling control signaling and the resource blocks of the at least one aggregation level. Specifically:

FIG. 5 is a schematic diagram of Embodiment 5 of the data transmission method according to the present invention. As shown in FIG. 5, the downlink bundled data in this embodiment may be PDCCH bundling control signaling. The base station may transmit multiple pieces of PDCCH control signaling with same content on multiple resource blocks of one or more of aggregation levels 1, 2, 4, and 8 separately. FIG. 5 shows an example in which the aggregation level is 2 and/or 8. For example, multiple pieces of PDCCH control signaling may be transmitted as the PDCCH bundling control signaling on resource blocks whose aggregation level is 2, or multiple pieces of PDCCH control signaling may be transmitted as the PDCCH bundling control signaling on several resource blocks whose aggregation level is 2, or two pieces of PDCCH control signaling may be transmitted as the PDCCH bundling control signaling on two resource blocks whose aggregation level is 8, or multiple pieces of PDCCH control signaling may be separately transmitted as the PDCCH bundling control signaling on several resource blocks whose aggregation level is 2 and on resource blocks whose aggregation level is 8. The multiple pieces of same PDCCH control signaling may use different RVs together to constitute the PDCCH bundling control signaling. After receiving the PDCCH bundling control signaling, the UE parses and acquires content of the PDCCH bundling control signaling according to a configuration parameter of a PDCCH control signaling bundling function. Specifically, if it is configured that two consecutive resource blocks constitute the PDCCH bundling control signaling when the aggregation level is 2, the UE can parse and acquire content of the PDCCH bundling control signaling on the two consecutive resource blocks. This embodiment of the present invention imposes no limitation on an aggregation level and a resource block that are involving PDCCH control signaling and a quantity of PDCCH control signaling.

A manner of bundling PDCCH control signaling may also be a time-domain bundling manner or a manner combining time-domain bundling and frequency-domain bundling. A specific implementation manner is similar to the PDSCH data bundling manner in the embodiments in FIG. 2 to FIG. 4, and therefore is not described herein again.

Figures 6, 7:
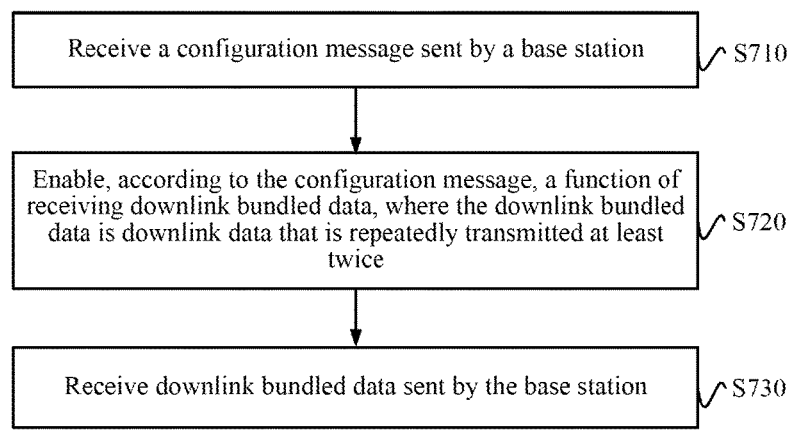
FIG. 6 is a schematic diagram of Embodiment 6 of a data transmission method according to the present invention.
FIG. 7 is a flowchart of Embodiment 7 of a data transmission method according to the present invention.

FIG. 6 is a schematic diagram of Embodiment 6 of the data transmission method according to the present invention. As shown in FIG. 6, a difference between this embodiment and the embodiment shown in FIG. 5 lies in that: the base station may not send PDCCH control signaling in a bundling manner, but transmits multiple pieces of PDCCH control signaling with same content separately on different aggregation levels and/or different resource blocks, for example, on multiple resource blocks whose aggregation level is 1 and/or 4. Provided that one piece of PDCCH control signaling is successfully parsed out, the UE can perform, according to the content of the PDCCH control signaling, a corresponding operation such as downlink data reception, uplink data sending, power adjustment, or measurement result reporting. It should be noted that the configuration process in the aforementioned embodiments may not be performed in advance in this method. The base station directly sends multiple pieces of PDCCH control signaling, and the UE attempts to parse the PDCCH control signaling according to the prior art. Provided that one piece of PDCCH control signaling is successfully parsed out, other PDCCH control signaling with same content may be no longer parsed or may be ignored after being parsed.

Sending PDCCH control signaling in a bundling manner or the manner of sending multiple pieces of PDCCH control signaling in a same TTI both can improve reliability of transmitting the PDCCH control signaling, thereby shortening a delay for transmitting data scheduled by using the PDCCH control signaling (if the PDCCH control signaling is a scheduling command), or enabling the user equipment to perform, in time, an operation such as power adjustment or measurement reporting.

The implementation manner of sending PDCCH control signaling in a bundling manner or sending multiple pieces of PDCCH control signaling may be used separately, or may be used together with an implementation manner of sending other downlink data, such as PDSCH data, excluding the PDCCH control signaling in a bundling manner.

According to the data transmission method provided in the embodiments of the present invention, a base station sends downlink data to user equipment in a downlink bundling manner, thereby improving reliability of downlink data transmission and shortening a delay of downlink data transmission. If the downlink data is a scheduling command used to schedule uplink data, reliability of transmitting the scheduling command can also be improved and a delay for transmitting the scheduled uplink data can also be shortened. If the downlink data is a power control command used to command the UE to perform power adjustment, the UE can also be enabled to perform power adjustment in time, thereby reducing power consumption or improving reliability of data transmission. If the downlink data is a measurement reporting command used to command the UE to perform measurement reporting, the UE can also be enabled to perform measurement reporting in time to provide reference for the base station, thereby improving efficiency of subsequent transmission. Further, a function of receiving downlink bundled data is flexibly configured and enabled for the UE, thereby preventing the UE from receiving, in all scenarios, the downlink data in a manner of receiving the downlink bundled data.

FIG. 7 is a flowchart of Embodiment 7 of a data transmission method according to the present invention. As shown in FIG. 7, in this embodiment, the data transmission method is described by using UE as an execution body. The method may include:

S710: Receive a configuration message sent by a base station.

The configuration message is used to configure, for the UE, a function of receiving downlink bundled (Bundling) data. The UE may receive, by using an RRC message, the configuration message sent by the base station. The RRC message may be a downlink RRC message such as an RRC connection setup (RRC Connection Setup) message or an RRC connection reconfiguration (RRC Connection Reconfiguration) message. In addition, a MAC message such as a MAC control element, or a physical layer message such as PDCCH control signaling may also be used to send the configuration message to the UE. This embodiment of the present invention imposes no limitation on a manner of receiving the configuration message.

S720: Enable, according to the configuration message, a function of receiving downlink bundled data, where the downlink bundled data is downlink data that is repeatedly transmitted at least twice.

After receiving the configuration message, the UE enables the function of receiving the downlink bundled data. The downlink bundled data is downlink data that is repeatedly transmitted at least twice. After enabling the function of receiving the downlink bundled data, the UE may acquire correct downlink data by receiving and together parsing the downlink data that is repeatedly transmitted at least twice. Certainly, if the UE can correctly parse the downlink data after receiving the downlink data that is transmitted once in the downlink bundled data, the downlink data that is subsequently transmitted in the downlink bundled data may also be ignored.

Specifically, the foregoing at least twice of repeated transmission may be repeated transmission on consecutive time-domain resources, may be repeated transmission on consecutive frequency-domain resources, or may be a combination of the foregoing two manners of repeated transmission.

The downlink data includes all data transmitted on a downlink channel, and may be PDCCH control signaling or PDSCH data. The PDCCH control signaling includes a scheduling command used to schedule uplink data, a power control command used to control power adjustment by the UE, a measurement reporting command used to instruct the UE to perform measurement reporting, or the like.

After receiving the configuration message, the UE may return a corresponding configuration complete message to the base station. If the configuration message is an RRC connection setup (RRC Connection Setup) message, the UE returns an RRC connection setup complete (RRC Connection Setup Complete) message. If the configuration message is an RRC connection reconfiguration (RRC Connection Reconfiguration) message, the UE returns an RRC connection reconfiguration complete (RRC Connection Reconfiguration Complete) message. If the configuration message is another downlink RRC message, the UE also returns a corresponding complete message, and this embodiment of the present invention imposes no limitation thereon.

S730: Receive downlink bundled data sent by the base station.

After enabling the function of receiving the downlink bundled data, the UE may receive the downlink bundled data sent by the base station, and acquire complete downlink data by parsing downlink data that is with same content and that is repeatedly transmitted multiple times in the downlink bundled data.

According to the data transmission method provided in this embodiment, UE receives downlink data that is sent by a base station in a downlink bundling manner, thereby improving reliability of downlink data transmission and shortening a delay of downlink data transmission. If the downlink data is a scheduling command used to schedule uplink data, reliability of transmitting the scheduling command can also be improved and a delay for transmitting the scheduled uplink data can also be shortened. If the downlink data is PDCCH control signaling such as a power control command or a measurement reporting command, reliability of transmitting the PDCCH control signaling can also be improved, and timeliness of power adjustment and measurement reporting performed by the user equipment can also be ensured. Further, a function of receiving downlink bundled data is flexibly configured and enabled for the UE, thereby preventing the UE from receiving, in all scenarios, the downlink data in a manner of receiving the downlink bundled data.

Further, the configuration message may further include a configuration parameter of the downlink bundled data; or a system broadcast message sent by the base station includes a configuration parameter of the downlink bundled data; or PDCCH control signaling sent by the base station includes a configuration parameter of the downlink bundled data. The receiving downlink bundled data sent by the base station includes: receiving, according to the configuration parameter of the downlink bundled data, the downlink bundled data sent by the base station. In short, the UE may further receive, by using the configuration message, the broadcast message, or the PDCCH control signaling, the configuration parameter, sent by the base station, of the downlink bundled data. The configuration parameter of the downlink bundled data may also be predefined in the base station and the UE.

Further, the receiving downlink bundled data sent by the base station includes: receiving, according to the configuration parameter of the downlink bundled data, the downlink bundled data sent by the base station, where the configuration parameter of the downlink bundled data includes at least one of the following parameters: a quantity of transmission times of same downlink data included in the downlink bundled data; a redundancy version rule corresponding to each piece of downlink data in the downlink bundled data; an uplink feedback resource used by the UE; a type of the downlink data in the downlink bundled data; a HARQ process number; and an HARQ RTT. Specifically:

The quantity of transmission times of the same downlink data included in the downlink bundled data may be understood as a quantity of pieces of same downlink data included in the downlink bundled data, for example, 4 pieces of same downlink data may be included.

According to an RV rule corresponding to each piece of downlink data in the downlink bundled data, for example, if the downlink bundled data includes 4 pieces of same downlink data, RV=0 may be used for a first piece of downlink data, and RVs 2, 3, and 1 may be used for second to fourth pieces of downlink data respectively, or a use sequence of RVs is preset as 0, 2, 3, and 1, and an RV used for a first piece of downlink data in the downlink bundled data is explicitly notified to the UE by the base station in a scheduling command, so that the UE can learn an RV used for each piece of downlink data in the downlink bundled data, or before transmitting the downlink bundled data each time, the base station may also notify, by using PDCCH control signaling, the UE of an RV used for each piece of downlink data in the downlink bundled data transmitted this time. This embodiment of the present invention imposes no limitation on a manner of notifying an RV corresponding to downlink data transmitted each time in the downlink bundled data.

A rule may be preset for the uplink feedback resource used by the UE. For example, the uplink feedback resource may be mapped in advance to a downlink resource occupied by PDCCH control signaling used to schedule transmission of the downlink bundled data, which may specifically be: Uplink feedback resource=Start position of a resource occupied by PDCCH control signaling+Offset. A specific preset manner is not limited thereto.

Further, the configuration parameter of the downlink data may further include that a type of the downlink data transmitted by using the downlink bundled data is PDSCH data, PDCCH control signaling, or a combination thereof. The PDCCH control signaling includes one or more of an uplink data scheduling command, a downlink data scheduling command, a power control command, a measurement reporting command, and the like, and may further include other control signaling transmitted on a PDCCH, which is not limited in this embodiment of the present invention.

Optionally, the type of the downlink data transmitted by using the downlink bundled data may be preconfigured. For example, it is preconfigured that the PDSCH data is transmitted by means of the downlink bundled data, or it is preconfigured that the PDCCH control signaling is transmitted by means of the downlink bundled data, or it is preconfigured that both the PDSCH data and the PDCCH control signaling are transmitted by means of the downlink bundled data.

Optionally, the configuration parameter of the downlink data may further include one or more of the following: a type of the downlink data transmitted by using the downlink bundled data is PDSCH data, a type of the downlink data transmitted by using the downlink bundled data is an uplink data scheduling command, a type of the downlink data transmitted by using the downlink bundled data is a PDSCH data scheduling command, a type of the downlink data transmitted by using the downlink bundled data is a power control command, or a type of the downlink data transmitted by using the downlink bundled data is a measurement command.

Optionally, the type of the downlink data transmitted by using a downlink bundling function may be preconfigured. For example, it is preconfigured that the PDSCH data is transmitted by means of the downlink bundled data, or it is preconfigured that the uplink data scheduling command is transmitted by means of the downlink bundled data, or it is preconfigured that the PDSCH data scheduling command is transmitted by means of the downlink bundled data, or it is preconfigured that the power control command is transmitted by means of the downlink bundled data, or it is preconfigured that the measurement command is transmitted by means of the downlink bundled data.

Further, the configuration message further includes one piece of the following indication information: first indication information used to indicate that a time-domain bundling manner is used for the downlink bundled data; second indication information used to indicate that a frequency-domain bundling manner is used for the downlink bundled data; and third indication information used to indicate that a time-domain bundling manner and a frequency-domain bundling manner are used for the downlink bundled data, where the time-domain bundling manner is a sending manner in which the downlink bundled data is repeatedly transmitted at least twice in a time domain, and the frequency-domain bundling manner is a sending manner in which the downlink bundled data is repeatedly transmitted at least twice in a frequency domain. That is, the UE may receive, in different time domains, multiple pieces of same downlink data transmitted in a bundling manner, may receive, in different frequency domains, multiple pieces of same downlink data transmitted in a bundling manner, or may transmit multiple pieces of same downlink data in different time domains and different frequency domains in a bundling manner. The UE may learn, according to the configuration message or a scheduling command, a receiving manner of bundled downlink data, or may preset or specify a receiving manner of bundled downlink data in a protocol.

Further, if the time-domain bundling manner is used for the downlink bundled data, the receiving downlink bundled data sent by the base station includes: receiving, in at least two consecutive downlink transmission time intervals TTIs, physical downlink shared channel PDSCH bundled data sent by the base station. Certainly, the PDSCH bundled data may also be sent to the UE in inconsecutive downlink TTIs, and no limitation is imposed thereon. When it is configured that the time-domain bundling manner is used for the PDSCH bundled data, the UE receives, in a first TTI of the at least two TTIs, physical downlink control channel PDCCH control signaling sent by the base station; or receives, in at least two TTIs, PDCCH control signaling sent by the base station. Specifically:

Reference may be made to FIG. 2. In this embodiment, the UE receives the PDSCH bundled data that is sent in the time-domain bundling manner. The base station sends a scheduling command to the UE in a first TTI to schedule the UE to receive the PDSCH bundled data, where the scheduling command may include the foregoing configuration parameter of the downlink bundled data. After learning the configuration parameter of the downlink bundled data, the UE can receive four pieces of same PDSCH data that are separately transmitted by the base station to four TTIs. The four pieces of same PDSCH data use different RVs together to constitute the PDSCH bundled data. After receiving the PDSCH bundled data, the UE parses and acquires content of the PDSCH bundled data according to the configuration parameter of the downlink bundled data. Certainly, the UE may also parse one or more pieces of PDSCH data in the PDSCH bundled data, and acquire the content of the PDSCH bundled data. For example, the UE may first parse a first piece of data in the PDSCH bundled data. If the parsing is successful and the content is acquired, the UE may no longer parse subsequent PDSCH data in the PDSCH bundled data. If the parsing is unsuccessful, the UE then parses a second, third, or fourth piece of PDSCH data, or together parses one or more pieces of PDSCH data in the PDSCH bundled data. A specific parsing manner is not limited herein.

Reference may be further made to FIG. 3. In this embodiment, the UE receives the PDSCH bundled data that is also sent in the time-domain bundling manner, but the UE receives, in four TTIs, four scheduling commands separately sent by the base station. The UE may further continue to parse scheduling commands in last three TTIs even if a scheduling command in a first TTI is not parsed out successfully. The base station may indicate, in the scheduling command, that the scheduling command is which scheduling command in the PDSCH bundled data, so as to enable the UE to clearly know a quantity of same scheduling commands to be transmitted subsequently. Further optionally, after the UE parses out one scheduling command in the PDSCH bundled data, the UE may no longer detect subsequent scheduling commands, and receive the PDSCH bundled data according to the scheduling command parsed out. In this embodiment of the present invention, a specific TTI and a quantity of times for sending a scheduling command may be flexibly selected as required. For example, the scheduling command may also be sent in first two TTIs or in first three TTIs, which is not limited thereto.

Likewise, the scheduling command may include the foregoing configuration parameter of the downlink bundled data. After learning the configuration parameter of the downlink bundled data, the UE may receive four pieces of same PDSCH data that are separately transmitted by the base station in the four TTIs. The four pieces of same PDSCH data may use different RVs together to constitute the PDSCH bundled data. After receiving the PDSCH bundled data, the UE parses and acquires content of the PDSCH bundled data according to the configuration parameter of the downlink bundled data.

A manner of receiving multiple scheduling commands in multiple TTIs can improve reliability of scheduling command transmission, thereby shortening a delay for transmitting data scheduled by using the scheduling commands.

Further, if the frequency-domain bundling manner is used for the downlink bundled data, the receiving downlink bundled data sent by the base station includes: receiving, on at least two resource blocks in one TTI, PDSCH bundled data sent by the base station. Receiving, in a TTI, the PDCCH control signaling sent by the base station may be receiving a scheduling command once, receiving a scheduling command multiple times in different frequency domains in the TTI, or receiving, before the TTI, a scheduling command sent by the base station. The configuration parameter of the downlink bundled data further includes frequency-domain resource indication information, where the frequency-domain resource indication information is used to indicate the at least two resource blocks used to transmit the PDSCH bundled data; the receiving, on at least two resource blocks in one TTI, PDSCH bundled data sent by the base station includes: receiving, on the at least two resource blocks in the one TTI according to the frequency-domain resource indication information, the PDSCH bundled data sent by the base station. Specifically:

Reference may be made to FIG. 4. In this embodiment, the UE receives the PDSCH bundled data that is sent by the base station in the frequency-domain bundling manner. The base station may transmit four pieces of PDSCH data with same content on four resource blocks A, B, C, and D in a same TTI separately. The four pieces of PDSCH data with the same content may use different RVs together to constitute the PDSCH bundled data. After receiving the PDSCH bundled data, the UE parses and acquires content of the PDSCH bundled data according to the configuration parameter of the downlink bundled data. A scheduling command used to configure the UE to receive the PDSCH bundled data may also be sent in the TTI. The scheduling command may further include frequency-domain resource indication information, instructing the UE to receive the PDSCH bundled data in a corresponding frequency domain. The frequency-domain resource indication information may specify that: a resource position allocated in the scheduling command is used as a start point, a size is used as a unit, and multiple consecutive resource blocks of a same size are used to send the PDSCH bundled data. Certainly, the PDSCH bundled data may also be sent by using multiple inconsecutive resource blocks or in another frequency-domain resource use manner, and this embodiment of the present invention imposes no limitation thereon. Optionally, a frequency-domain resource use manner may also be indicated or preconfigured in the configuration message. For example, it is indicated in the configuration message whether consecutive resource blocks or inconsecutive resource blocks are used to send the PDSCH bundled data. If inconsecutive resource blocks are used, information such as a spacing between adjacent resource blocks may be further included, and no limitation is imposed thereon.

Relative to receiving downlink data in the time-domain bundling manner, receiving downlink data in the frequency-domain bundling manner may further reduce a data transmission delay.

Based on the embodiments in FIG. 2 to FIG. 4, the foregoing time-domain bundling manner and frequency-domain bundling manner may be used in a combined manner. For example, the downlink bundled data may be four pieces of same downlink data that are respectively transmitted on two resource blocks in a first TTI and on two resource blocks in a second TTI.

In the embodiments shown in FIG. 2 to FIG. 4, the data transmission method provided in the embodiments of the present invention is described by using an example in which the downlink bundled data is downlink data that is repeatedly transmitted four times. However, a quantity of times of repeatedly transmitting downlink data in the downlink bundled data in the embodiments of the present invention may be flexibly selected according to different scenarios, and no limitation is imposed thereon.

Further, the downlink bundled data is PDCCH bundling control signaling; and the receiving downlink bundled data sent by the base station includes: receiving the PDCCH bundling control signaling sent by the base station. Further, if the frequency-domain bundling manner is used for the PDCCH bundling control signaling, the receiving the PDCCH bundling control signaling sent by the base station includes: receiving, on at least two resource blocks of at least one aggregation level in one TTI, the PDCCH bundling control signaling sent by the base station. The configuration parameter of the downlink bundled data further includes aggregation level indication information, where the aggregation level indication information is used to indicate the at least one aggregation level used to transmit the PDCCH bundling control signaling and the resource blocks of the at least one aggregation level; the receiving, on at least two resource blocks of at least one aggregation level in one TTI, the PDCCH bundling control signaling sent by the base station includes: receiving, at a corresponding aggregation level and on a resource block of the aggregation level, the PDCCH bundling control signaling according to the aggregation level indication information. Specifically:

Reference may be made to FIG. 5. The downlink bundled data in this embodiment may be PDCCH bundling control signaling. The base station may transmit multiple pieces of PDCCH control signaling with same content on multiple resource blocks of one or more of aggregation levels 1, 2, 4, and 8 separately. FIG. 5 shows an example in which the aggregation level is 2 and/or 8. For example, multiple pieces of PDCCH control signaling may be transmitted as the PDCCH bundling control signaling on resource blocks whose aggregation level is 2, or multiple pieces of PDCCH control signaling may be transmitted as the PDCCH bundling control signaling on several resource blocks whose aggregation level is 2, or two pieces of PDCCH control signaling may be transmitted as the PDCCH bundling control signaling on two resource blocks whose aggregation level is 8, or multiple pieces of PDCCH control signaling may be separately transmitted as the PDCCH bundling control signaling on several resource blocks whose aggregation level is 2 and on resource blocks whose aggregation level is 8. The multiple pieces of PDCCH control signaling with the same content may use different RVs together to constitute a bundled scheduling command. After receiving the PDCCH bundling control signaling, the UE parses and acquires, at a corresponding aggregation level, content of the PDCCH bundling control signaling according to a configuration parameter of a PDCCH control signaling bundling function. Specifically, if it is configured that two consecutive resource blocks constitute the PDCCH bundling control signaling when the aggregation level is 2, the UE can parse and acquire content of the PDCCH bundling control signaling on the two consecutive resource blocks. This embodiment of the present invention imposes no limitation on an aggregation level and a resource block that are involving PDCCH control signaling and a quantity of PDCCH control signaling.

A manner of bundling PDCCH control signaling may also be a time-domain bundling manner or a manner combining time-domain bundling and frequency-domain bundling. A specific implementation manner is similar to the PDSCH data bundling manner in the embodiments in FIG. 2 to FIG. 4, and therefore is not described herein again.

In addition, reference may be made to FIG. 6. The UE may not parse PDCCH control signaling in a bundling manner, but receives multiple pieces of same PDCCH control signaling separately on different aggregation levels and/or different resource blocks, for example, on multiple resource blocks whose aggregation level is 1 and/or 4. Provided that one piece of PDCCH control signaling is successfully parsed out, the UE can perform, according to the content of the PDCCH control signaling, a corresponding operation such as downlink data reception, uplink data sending, power adjustment, or measurement result reporting. It should be noted that the configuration process in the aforementioned embodiments may not be performed in advance in this method. The base station directly sends multiple pieces of PDCCH control signaling, and the UE attempts to parse the PDCCH control signaling according to the prior art. Provided that one piece of PDCCH control signaling is successfully parsed out, other PDCCH control signaling with same content may be no longer parsed or may be ignored after being parsed.

Receiving PDCCH control signaling in a bundling manner or the manner of receiving multiple pieces of PDCCH control signaling in a same TTI both can improve reliability of transmitting the PDCCH control signaling, thereby shortening a delay for transmitting data scheduled by using the PDCCH control signaling (if the PDCCH control signaling is a scheduling command), or enabling the user equipment to perform, in time, an operation such as power adjustment or measurement reporting.

The implementation manner of receiving PDCCH control signaling in a bundling manner or receiving multiple pieces of PDCCH control signaling may be used separately, or may be used together with an implementation manner of receiving other downlink data, such as PDSCH data, excluding the PDCCH control signaling in a bundling manner.

According to the data transmission method provided in the embodiments of the present invention, user equipment receives, in a downlink bundling manner, downlink data sent by a base station, thereby improving reliability of downlink data transmission and shortening a delay of downlink data transmission. If the downlink data is a scheduling command used to schedule uplink data, reliability of transmitting the scheduling command can also be improved and a delay for transmitting the scheduled uplink data can also be shortened. If the downlink data is a power control command used to command the UE to perform power adjustment, the UE can also be enabled to perform power adjustment in time, thereby reducing power consumption or improving reliability of data transmission. If the downlink data is a measurement reporting command used to command the UE to perform measurement reporting, the UE can also be enabled to perform measurement reporting in time to provide reference for the base station, thereby improving efficiency of subsequent transmission. Further, a function of receiving downlink bundled data is flexibly configured and enabled for the UE, thereby preventing the UE from receiving, in all scenarios, the downlink data in a manner of receiving the downlink bundled data.

Figure 8:
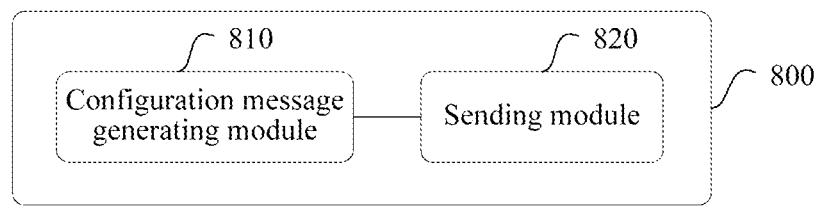
FIG. 8 is a schematic structural diagram of Embodiment 1 of a data transmission apparatus according to the present invention.

FIG. 8 is a schematic structural diagram of Embodiment 1 of a data transmission apparatus 800 according to the present invention. As shown in FIG. 8, the data transmission apparatus 800 provided in this embodiment may be disposed on a base station, or may be a base station itself. The data transmission apparatus 800 may include:

a configuration message generating module 810, configured to generate a configuration message, where the configuration message is used to configure, for user equipment UE, a function of receiving downlink bundled data, and the downlink bundled data is downlink data that is repeatedly transmitted at least twice; and a sending module 820, configured to send the configuration message generated by the configuration message generating module 810 to the UE and send the downlink bundled data to the UE.

The data transmission apparatus 800 provided in this embodiment may be configured to execute the technical solution in the method embodiment shown in FIG. 1. An implementation principle and a technical effect of the data transmission apparatus 800 are similar to those of the technical solution, and details are not described herein again.

Further, the sending module 820 is specifically configured to send the downlink bundled data to the UE according to a configuration parameter of the downlink bundled data, where the configuration parameter of the downlink bundled data includes at least one of the following parameters: a quantity of transmission times of same downlink data included in the downlink bundled data; a redundancy version rule corresponding to each piece of downlink data in the downlink bundled data; an uplink feedback resource used by the UE; a type of the downlink data in the downlink bundled data; a hybrid automatic repeat request process number; and a hybrid automatic repeat request round-trip time.

Further, the configuration message generated by the configuration message generating module 810 further includes one piece of the following indication information: first indication information used to indicate that a time-domain bundling manner is used for the downlink bundled data; second indication information used to indicate that a frequency-domain bundling manner is used for the downlink bundled data; and third indication information used to indicate that a time-domain bundling manner and a frequency-domain bundling manner are used for the downlink bundled data, where the time-domain bundling manner is a sending manner in which the downlink bundled data is repeatedly transmitted at least twice in a time domain, and the frequency-domain bundling manner is a sending manner in which the downlink bundled data is repeatedly transmitted at least twice in a frequency domain.

Further, if the time-domain bundling manner is used for the downlink bundled data, the sending module 820 is specifically configured to send physical downlink shared channel PDSCH bundled data to the UE in at least two consecutive downlink transmission time intervals TTIs.

Further, the sending module 820 is further configured to: send physical downlink control channel PDCCH control signaling to the UE in a first TTI of the at least two TTIs; or send PDCCH control signaling to the UE in at least two TTIs.

Further, if the frequency-domain bundling manner is used for the downlink bundled data, the sending module 820 is specifically configured to send PDSCH bundled data to the UE on at least two resource blocks in one TTI.

Further, the sending module 820 is further configured to send PDCCH control signaling to the UE in the TTI.

Further, the configuration parameter of the downlink bundled data further includes frequency-domain resource indication information, where the frequency-domain resource indication information is used to indicate the at least two resource blocks used to transmit the PDSCH bundled data.

Further, the downlink bundled data is PDCCH bundling control signaling, and the sending module 820 is specifically configured to send the PDCCH bundling control signaling to the UE.

Further, if the frequency-domain bundling manner is used for the PDCCH bundling control signaling, the sending module 820 is specifically configured to send the PDCCH bundling control signaling to the UE on at least two resource blocks of at least one aggregation level in one TTI.

Further, the configuration parameter of the downlink bundled data further includes aggregation level indication information, where the aggregation level indication information is used to indicate the at least one aggregation level used to transmit the PDCCH bundling control signaling and the resource blocks of the at least one aggregation level.

The data transmission apparatus 800 provided in this embodiment may be configured to execute the technical solution in the method embodiment shown in any one of FIG. 1 to FIG. 6. An implementation principle and a technical effect of the data transmission apparatus 800 are similar to those of the technical solution, and details are not described herein again.

Figure 9:
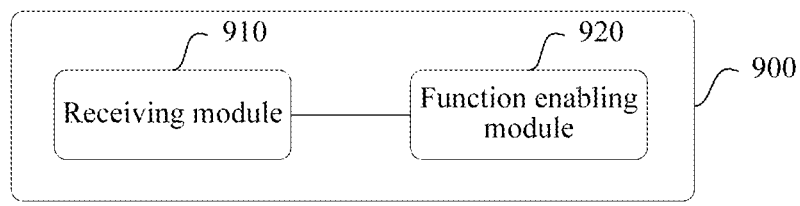
FIG. 9 is a schematic structural diagram of Embodiment 2 of a data transmission apparatus according to the present invention.

FIG. 9 is a schematic structural diagram of Embodiment 2 of a data transmission apparatus 900 according to the present invention. As shown in FIG. 9, the data transmission apparatus 900 provided in this embodiment may be disposed on UE, or may be UE itself. The data transmission apparatus 900 may include:

a receiving module 910, configured to receive a configuration message sent by a base station; and a function enabling module 920, configured to enable, according to the configuration message received by the receiving module 910, a function of receiving downlink bundled data, where the downlink bundled data is downlink data that is repeatedly transmitted at least twice, where the receiving module 910 is further configured to receive downlink bundled data sent by the base station.

The data transmission apparatus 900 provided in this embodiment may be configured to execute the technical solution in the method embodiment shown in FIG. 7. An implementation principle and a technical effect of the data transmission apparatus 900 are similar to those of the technical solution, and details are not described herein again.

Further, the receiving module 910 is specifically configured to receive, according to a configuration parameter of the downlink bundled data, the downlink bundled data sent by the base station, where the configuration parameter of the downlink bundled data includes at least one of the following parameters: a quantity of transmission times of same downlink data included in the downlink bundled data; a redundancy version rule corresponding to each piece of downlink data in the downlink bundled data; an uplink feedback resource used by the UE; a type of the downlink data in the downlink bundled data; a hybrid automatic repeat request process number; and a hybrid automatic repeat request round-trip time.

Further, the configuration message received by the receiving module 910 further includes one piece of the following indication information: first indication information used to indicate that a time-domain bundling manner is used for the downlink bundled data; second indication information used to indicate that a frequency-domain bundling manner is used for the downlink bundled data; and third indication information used to indicate that a time-domain bundling manner and a frequency-domain bundling manner are used for the downlink bundled data, where the time-domain bundling manner is a sending manner in which the downlink bundled data is repeatedly transmitted at least twice in a time domain, and the frequency-domain bundling manner is a sending manner in which the downlink bundled data is repeatedly transmitted at least twice in a frequency domain.

Further, if the time-domain bundling manner is used for the downlink bundled data, the receiving module 910 is specifically configured to receive, in at least two consecutive downlink transmission time intervals TTIs, physical downlink shared channel PDSCH bundled data sent by the base station.

Further, the receiving module 910 is further configured to: receive, in a first TTI of the at least two TTIs, physical downlink control channel PDCCH control signaling sent by the base station; or receive, in at least two TTIs, PDCCH control signaling sent by the base station.

Further, if the frequency-domain bundling manner is used for the downlink bundled data, the receiving module 910 is specifically configured to receive, on at least two resource blocks in one TTI, PDSCH bundled data sent by the base station.

Further, the receiving module 910 is further configured to receive, in the TTI, PDCCH control signaling sent by the base station.

Further, the configuration parameter of the downlink bundled data further includes frequency-domain resource indication information, where the frequency-domain resource indication information is used to indicate the at least two resource blocks used to transmit the PDSCH bundled data; and the receiving module 910 is specifically configured to receive, on the at least two resource blocks in the one TTI according to the frequency-domain resource indication information, the PDSCH bundled data sent by the base station.

Further, the downlink bundled data is PDCCH bundling control signaling; and the receiving module 910 is specifically configured to receive the PDCCH bundling control signaling sent by the base station.

Further, if the frequency-domain bundling manner is used for the PDCCH bundling control signaling, the receiving module 910 is specifically configured to receive, on at least two resource blocks of at least one aggregation level in one TTI, the PDCCH bundling control signaling sent by the base station.

Further, the configuration parameter of the downlink bundled data further includes aggregation level indication information, where the aggregation level indication information is used to indicate the at least one aggregation level used to transmit the PDCCH bundling control signaling and the resource blocks of the at least one aggregation level; and the receiving module 910 is specifically configured to receive, at a corresponding aggregation level and on a resource block of the aggregation level, the PDCCH bundling control signaling according to the aggregation level indication information.

The data transmission apparatus 900 provided in this embodiment may be configured to execute the technical solution in the method embodiment shown in any one of FIG. 2 to FIG. 7. An implementation principle and a technical effect of the data transmission apparatus 900 are similar to those of the technical solution, and details are not described herein again.

Figure 10:
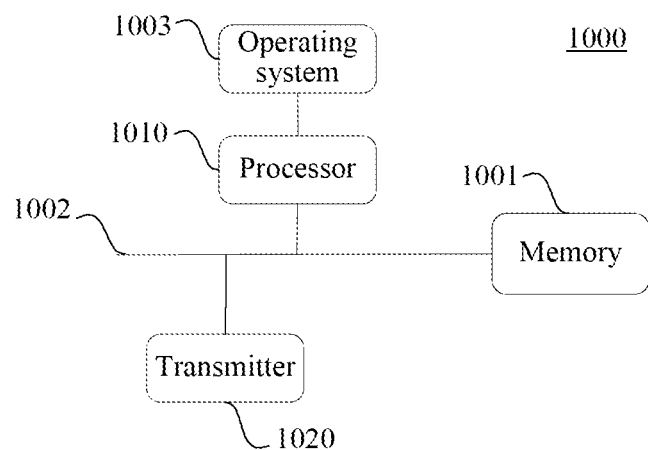
FIG. 10 is a schematic structural diagram of an embodiment of a base station according to the present invention.

FIG. 10 is a schematic structural diagram of an embodiment of a base station 1000 according to the present invention. As shown in FIG. 10, the base station 1000 provided in this embodiment may include: at least one processor 1010, for example, a CPU; a transmitter 1020; a memory 1001; at least one communications bus 1002; and an operating system 1003. The communications bus 1002 is configured to implement connection and communication between these apparatuses. The memory 1001 may include a high-speed RAM memory, or may further include a non-volatile memory (non-volatile memory), for example, at least one disk memory. Optionally, the memory 1001 may include at least one storage apparatus that is located far away from the aforementioned processor 1010. The operating system 1003 includes various programs for implementing various basic services and processing hardware-based tasks.

The processor 1010 is configured to generate a configuration message, where the configuration message is used to configure, for user equipment UE, a function of receiving downlink bundled data, and the downlink bundled data is downlink data that is repeatedly transmitted at least twice.

The transmitter 1020 is configured to send the configuration message generated by the processor 1010 to the UE and send the downlink bundled data to the UE.

The base station 1000 provided in this embodiment may be configured to execute the technical solution in the method embodiment shown in FIG. 1. An implementation principle and a technical effect of the base station 1000 are similar to those of the technical solution, and details are not described herein again.

Further, the transmitter 1020 is specifically configured to send the downlink bundled data to the UE according to a configuration parameter of the downlink bundled data, where the configuration parameter of the downlink bundled data includes at least one of the following parameters: a quantity of transmission times of same downlink data included in the downlink bundled data; a redundancy version rule corresponding to each piece of downlink data in the downlink bundled data; an uplink feedback resource used by the UE; a type of the downlink data in the downlink bundled data; a hybrid automatic repeat request process number; and a hybrid automatic repeat request round-trip time.

Further, the configuration message generated by the processor 1010 further includes one piece of the following indication information: first indication information used to indicate that a time-domain bundling manner is used for the downlink bundled data; second indication information used to indicate that a frequency-domain bundling manner is used for the downlink bundled data; and third indication information used to indicate that a time-domain bundling manner and a frequency-domain bundling manner are used for the downlink bundled data, where the time-domain bundling manner is a sending manner in which the downlink bundled data is repeatedly transmitted at least twice in a time domain, and the frequency-domain bundling manner is a sending manner in which the downlink bundled data is repeatedly transmitted at least twice in a frequency domain.

Further, if the time-domain bundling manner is used for the downlink bundled data, the transmitter 1020 is specifically configured to send physical downlink shared channel PDSCH bundled data to the UE in at least two consecutive downlink transmission time intervals TTIs.

Further, the transmitter 1020 is further configured to: send physical downlink control channel PDCCH control signaling to the UE in a first TTI of the at least two TTIs; or send PDCCH control signaling to the UE in at least two TTIs.

Further, if the frequency-domain bundling manner is used for the downlink bundled data, the transmitter 1020 is specifically configured to send PDSCH bundled data to the UE on at least two resource blocks in one TTI.

Further, the transmitter 1020 is further configured to send PDCCH control signaling to the UE in the TTI.

Further, the configuration parameter of the downlink bundled data further includes frequency-domain resource indication information, where the frequency-domain resource indication information is used to indicate the at least two resource blocks used to transmit the PDSCH bundled data.

Further, the downlink bundled data is PDCCH bundling control signaling; and the transmitter 1020 is specifically configured to send the PDCCH bundling control signaling to the UE.

Further, if the frequency-domain bundling manner is used for the PDCCH bundling control signaling, the transmitter 1020 is specifically configured to send the PDCCH bundling control signaling to the UE on at least two resource blocks of at least one aggregation level in one TTI.

Further, the configuration parameter of the downlink bundled data further includes aggregation level indication information, where the aggregation level indication information is used to indicate the at least one aggregation level used to transmit the PDCCH bundling control signaling and the resource blocks of the at least one aggregation level.

The base station 1000 provided in this embodiment may be configured to execute the technical solution in the method embodiment shown in any one of FIG. 1 to FIG. 6. An implementation principle and a technical effect of the base station 1000 are similar to those of the technical solution, and details are not described herein again.

Figure 11:
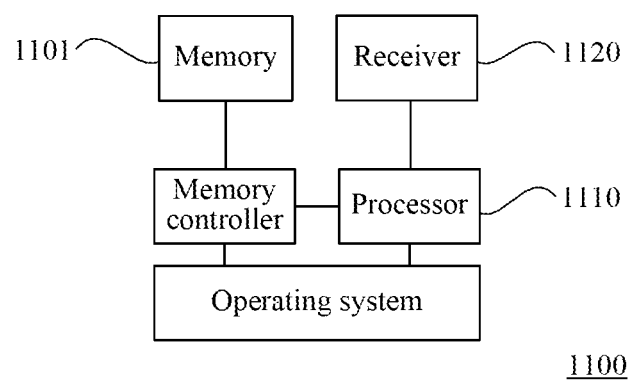
FIG. 11 is a schematic structural diagram of an embodiment of user equipment according to the present invention.

FIG. 11 is a schematic structural diagram of an embodiment of user equipment 1100 according to the present invention. As shown in FIG. 11, the user equipment 1100 provided in this embodiment may include: at least one memory 1101, at least one processor 1110, and a receiver 1120. Optionally, the user equipment 1100 may further include: an I/O (Input/Output, input/output, I/O for short) subsystem, an audio circuit, an external interface, a memory controller, an operating system, and the like. The processor 1110, for example, may be a central processing unit CPU (Central Processing Unit, CPU for short).

The foregoing components communicate with each other by using one or more communications buses or signal cables. The user equipment 1100 may include but be not limited to a mobile phone, a tablet computer, or the like. The components shown in FIG. 11 may be implemented by using hardware, software, or a combination of software and hardware, including one or more signal processing and/or application specific integrated circuits. The memory 1101 may include a high-speed random access memory, a non-volatile solid storage device, and the like. The memory controller may control access of other components such as the processor 1110 of the user equipment 1100 to the memory 1101, so as to invoke the modules in the memory 1101 to execute corresponding functions.

The receiver 1120 is configured to receive a configuration message sent by a base station.

The processor 1110 is configured to enable, according to the configuration message received by the receiver 1120, a function of receiving downlink bundled data, where the downlink bundled data is downlink data that is repeatedly transmitted at least twice.

The receiver 1120 is further configured to receive downlink bundled data sent by the base station.

The user equipment 1100 provided in this embodiment may be configured to execute the technical solution in the method embodiment shown in FIG. 7. An implementation principle and a technical effect of the user equipment 1100 are similar to those of the technical solution, and details are not described herein again.

Further, the receiver 1120 is specifically configured to receive, according to a configuration parameter of the downlink bundled data, the downlink bundled data sent by the base station, where the configuration parameter of the downlink bundled data includes at least one of the following parameters: a quantity of transmission times of same downlink data included in the downlink bundled data; a redundancy version rule corresponding to each piece of downlink data in the downlink bundled data; an uplink feedback resource used by the UE; a type of the downlink data in the downlink bundled data; a hybrid automatic repeat request process number; and a hybrid automatic repeat request round-trip time.

Further, the configuration message received by the receiver 1120 further includes one piece of the following indication information: first indication information used to indicate that a time-domain bundling manner is used for the downlink bundled data; second indication information used to indicate that a frequency-domain bundling manner is used for the downlink bundled data; and third indication information used to indicate that a time-domain bundling manner and a frequency-domain bundling manner are used for the downlink bundled data, where the time-domain bundling manner is a sending manner in which the downlink bundled data is repeatedly transmitted at least twice in a time domain, and the frequency-domain bundling manner is a sending manner in which the downlink bundled data is repeatedly transmitted at least twice in a frequency domain.

Further, if the time-domain bundling manner is used for the downlink bundled data, the receiver 1120 is specifically configured to receive, in at least two consecutive downlink transmission time intervals TTIs, physical downlink shared channel PDSCH bundled data sent by the base station.

Further, the receiver 1120 is further configured to: receive, in a first TTI of the at least two TTIs, physical downlink control channel PDCCH control signaling sent by the base station; or receive, in at least two TTIs, PDCCH control signaling sent by the base station.

Further, if the frequency-domain bundling manner is used for the downlink bundled data, the receiver 1120 is specifically configured to receive, on at least two resource blocks in one TTI, PDSCH bundled data sent by the base station.

Further, the receiver 1120 is further configured to receive, in the TTI, PDCCH control signaling sent by the base station.

Further, the configuration parameter of the downlink bundled data further includes frequency-domain resource indication information, where the frequency-domain resource indication information is used to indicate the at least two resource blocks used to transmit the PDSCH bundled data; and the receiver 1120 is specifically configured to receive, on the at least two resource blocks in the one TTI according to the frequency-domain resource indication information, the PDSCH bundled data sent by the base station.

Further, the downlink bundled data is PDCCH bundling control signaling; and the receiver 1120 is specifically configured to receive the PDCCH bundling control signaling sent by the base station.

Further, if the frequency-domain bundling manner is used for the PDCCH bundling control signaling, the receiver 1120 is specifically configured to receive, on at least two resource blocks of at least one aggregation level in one TTI, the PDCCH bundling control signaling sent by the base station.

Further, the configuration parameter of the downlink bundled data further includes aggregation level indication information, where the aggregation level indication information is used to indicate the at least one aggregation level used to transmit the PDCCH bundling control signaling and the resource blocks of the at least one aggregation level; and the receiver 1120 is specifically configured to receive, at a corresponding aggregation level and on a resource block of the aggregation level, the PDCCH bundling control signaling according to the aggregation level indication information.

The user equipment 1100 provided in this embodiment may be configured to execute the technical solution in the method embodiment shown in any one of FIG. 2 to FIG. 7. An implementation principle and a technical effect of the user equipment 1100 are similar to those of the technical solution, and details are not described herein again.

To sum up, according to the data transmission method and apparatus provided in the embodiments of the present invention, downlink data is transmitted in a downlink bundling manner, thereby improving reliability of downlink data transmission and shortening a delay of downlink data transmission. If the downlink data is a scheduling command used to schedule uplink data, reliability of transmitting the scheduling command can also be improved and a delay for transmitting the scheduled uplink data can also be shortened. If the downlink data is PDCCH control signaling such as a power control command or a measurement reporting command, reliability of transmitting the PDCCH control signaling can also be improved, and timeliness of power adjustment and measurement reporting performed by user equipment can also be ensured. Further, a function of receiving downlink bundled data is flexibly configured and enabled for the UE, thereby preventing the UE from receiving, in all scenarios, the downlink data in a manner of receiving the downlink bundled data.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as these modifications or replacements do not cause the essence of the corresponding technical solutions to depart from the scope of the technical solutions of the embodiments of the present invention.

What is claimed is:

1. A data transmission method, comprising:
receiving, by a user equipment (UE), a configuration message from a base station, wherein the configuration message is used to configure, for the UE, a function of receiving physical downlink shared channel (PDSCH) data for the UE and physical downlink control channel (PDCCH) control signaling for the UE, and wherein the configuration message includes information about a first quantity of transmission times of same PDCCH control signaling for the UE and information about a second quantity of transmission times of same PDSCH data for the UE, and the first quantity of transmission times of same PDCCH control signaling for the UE is equal to the second quantity of transmission times of same PDSCH data for the UE;
receiving, by the UE, the PDCCH control signaling from the base station according to the information about the first quantity of transmission times of same PDCCH control signaling for the UE, wherein the PDCCH control signaling is located in a first set of at least two consecutive downlink transmission time intervals;
receiving, by the UE, PDSCH bundled data from the base station according to the information about the second quantity of transmission times of same PDSCH data for the UE; and
parsing one or more pieces of PDSCH data in the PDSCH bundled data until content of the PDSCH bundled data is successfully obtained by the UE, wherein the PDSCH bundled data is located in a second set of at least two downlink transmission time intervals.

2. The method according to claim 1, wherein the configuration message further comprises:
indication information indicating that a time-domain bundling manner is used for downlink bundled data.

3. The method according to claim 1, wherein the second set of at least two downlink transmission time intervals is a second set of at least two consecutive downlink transmission time intervals.

4. A user equipment (UE), comprising:
a processor; and
a non-transitory computer-readable storage medium coupled to the processor and storing programming instructions for execution by the processor, wherein the programming instructions instruct the processor to:
receive a configuration message from a base station, wherein the configuration message is used to configure, for the UE, a function of receiving physical downlink shared channel (PDSCH) data for the UE and physical downlink control channel (PDCCH) control signaling for the UE, and wherein the configuration message includes information about a first quantity of transmission times of same PDCCH control signaling for the UE and information about a second quantity of transmission times of same PDSCH data for the UE, and the first quantity of transmission times of same PDCCH control signaling for the UE is equal to the second quantity of transmission times of same PDSCH data for the UE;
receive, the PDCCH control signaling from the base station according to the information about the first quantity of transmission times of same PDCCH control signaling for the UE, wherein the PDCCH control signaling is located in a first set of at least two consecutive downlink transmission time intervals;
receive PDSCH bundled data from the base station according to the information about the second quantity of transmission times of same PDSCH data for the UE; and
parse one or more pieces of PDSCH data in the PDSCH bundled data until content of the PDSCH bundled data is successfully obtained by the UE, wherein the PDSCH bundled data is located in a second set of at least two downlink transmission time intervals.

5. The UE according to claim 4, wherein the configuration message further comprises:
indication information indicating that a time-domain bundling manner is used for downlink bundled data.

6. The UE according to claim 4, wherein the second set of at least two downlink transmission time intervals is a second set of at least two consecutive downlink transmission time intervals.

7. A non-transitory computer-readable media storing computer instructions that, when executed by one or more processors, cause the one or more processors to:

receive a configuration message from a base station, wherein the configuration message is used to configure, for a user equipment (UE), a function of receiving physical downlink shared channel (PDSCH) data for the UE and physical downlink control channel (PDCCH) control signaling for the UE, and wherein the configuration message includes information about a first quantity of transmission times of same PDCCH control signaling for the UE and information about a second quantity of transmission times of same PDSCH data for the UE, and the first quantity of transmission times of same PDCCH control signaling for the UE is equal to the second quantity of transmission times of same PDSCH data for the UE;

receive the PDCCH control signaling from the base station according to the information about the first quantity of transmission times of same PDCCH control signaling for the UE, wherein the PDCCH control signaling is located in a first set of at least two consecutive downlink transmission time intervals;

receive PDSCH bundled data from the base station according to the information about the second quantity of transmission times of same PDSCH data for the UE; and parse one or more pieces of PDSCH data in the PDSCH bundled data until content of the PDSCH bundled data is successfully obtained by the UE, wherein the PDSCH bundled data is located in a second set of at least two downlink transmission time intervals.

8. The non-transitory computer-readable media according to claim 7, wherein the configuration message further comprises:
  indication information indicating that a time-domain bundling manner is used for downlink bundled data.

9. The non-transitory computer-readable media according to claim 7, wherein the second set of at least two downlink transmission time intervals is a second set of at least two consecutive downlink transmission time intervals.

* * * * *